US009688179B2

(12) United States Patent
White et al.

(10) Patent No.: US 9,688,179 B2
(45) Date of Patent: *Jun. 27, 2017

(54) GOLF CART VENDING SERVICE UNIT

(71) Applicant: 19th HOLE CART LLC, Scottsdale, AZ (US)

(72) Inventors: Michael White, Phoenix, AZ (US); Chris M. Buttenob, Scottsdale, AZ (US); Thomas Paul Muday, Scottsdale, AZ (US)

(73) Assignee: 19th HOLE CART LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/463,465

(22) Filed: Aug. 19, 2014

(65) Prior Publication Data

US 2014/0354000 A1   Dec. 4, 2014

Related U.S. Application Data

(63) Continuation of application No. 13/748,423, filed on Jan. 23, 2013, now Pat. No. 8,844,994.

(51) Int. Cl.
*B60P 3/025* (2006.01)
*B62D 65/02* (2006.01)

(52) U.S. Cl.
CPC ............ *B60P 3/0257* (2013.01); *B62D 65/02* (2013.01); *Y10S 280/05* (2013.01); *Y10T 29/49826* (2015.01)

(58) Field of Classification Search
CPC .......... B60P 3/0257; B60R 9/00; B60R 11/00; Y10S 280/05; B62D 65/02
USPC .. 296/24.35, 24.36, 22, 24.45, 193.03, 37.1; 280/DIG. 5; 224/274
See application file for complete search history.

(56) References Cited

U.S. PATENT DOCUMENTS

| | | | | |
|---|---|---|---|---|
| D343,596 S | * | 1/1994 | Writt, Jr. ................ | B60R 11/06 D12/1 |
| 6,034,355 A | * | 3/2000 | Naderi .................. | A47J 27/004 219/386 |
| 6,203,087 B1 | * | 3/2001 | Lance .................... | B60R 11/06 224/403 |
| 7,044,335 B2 | * | 5/2006 | Aguirre ................ | B67D 1/0406 222/129.1 |

(Continued)

*Primary Examiner* — Jason S Morrow
*Assistant Examiner* — E Turner Hicks
(74) *Attorney, Agent, or Firm* — Schmeiser, Olsen & Watts LLP

(57) ABSTRACT

Disclosed is a vending service unit that couples to a golf cart vehicle to form a golf cart with food and retail service features. The vending service unit includes modules that allow hot and cold food and beverages to be stored and sold, and other retail items such as tobacco, golf supplies, and ice to be displayed and sold from the golf cart with food and retail service features. The vending service unit includes removable concession modules that a vendor can easily and quickly replace and/or interchange. The disclosed vending service unit includes drawers that allow different types of beverage to be stored and sold. The drawers are individually insulated and can be individually heated or chilled for different food temperatures and types. The vending service unit includes a counter surface that can be used to set items upon and upon which to conduct business.

13 Claims, 25 Drawing Sheets

(56) References Cited

U.S. PATENT DOCUMENTS

| | | | |
|---|---|---|---|
| 7,418,311 B1* | 8/2008 | Lagassey | G07F 9/026 221/150 R |
| 7,669,740 B2* | 3/2010 | Saunders | G07F 9/10 141/231 |
| 2004/0256872 A1* | 12/2004 | Piper | B60P 3/0257 296/24.36 |
| 2006/0273604 A1* | 12/2006 | Luthe | A47J 31/4403 296/22 |

* cited by examiner

GOLF CART VENDING SERVICE UNIT

CROSS REFERENCE TO RELATED APPLICATION

This application claims priority to U.S. Patent Application to 19$^{TH}$ Hole Cart LLC entitled "GOLF CART VENDING SERVICE UNIT," Ser. No. 13/748,423, filed Jan. 23, 2013, now pending, the disclosures of which are hereby incorporated entirely herein by reference.

BACKGROUND OF THE INVENTION

Technical Field

This invention relates to golf carts and in particular to a vending service unit that attaches to a golf cart for providing retail food and beverage services from the golf cart.

State of the Art

Golfing is a popular sport worldwide. Each golfer spends anywhere from an hour to several hours on the golf course for each golf outing. There is a growing need for food, beverages, and other supplies to be provided to the golfers while they are on the golf course. Golfers are willing to purchase retail items that they need for their golf game or that will make their golf game more enjoyable. Each golf course has one or more clubhouse(s) where supplies are sold, but the golfers usually have to leave the golf course to visit the clubhouse. Retail buildings can be strategically placed on the golf course, but this is expensive and upsets the flow and design of a golf course. Golfers do not want to leave the golf course to obtain supplies, so it makes sense to provide a mobile unit that travels to the golfers on the golf course to provide supplies for them.

Accordingly, what is needed is a mobile retail facility such as a golf cart with retail service features that can be easily moved to where the golfers are and can supply the golfers with food, beverages, and other purchasable items.

DISCLOSURE OF THE INVENTION

This invention relates to golf carts and in particular to a vending service unit that attaches to a golf cart for providing food, beverage and other retail services from the golf cart vending service unit.

Disclosed is a golf cart vending service unit with food and retail service features. The golf cart with food and retail service features according to the invention includes a golf cart vehicle and a vending service unit. The vending service unit couples to the golf cart vehicle. The vending service unit comprises a vending service unit body and at least one drawer that couples to the vending service unit body. In some embodiments the vending service unit further comprises a counter that couples to the vending service unit body above the at least one drawer. In some embodiments the at least one drawer is four drawers that each couple to the vending service unit body beneath the counter, and wherein more than one of the four drawers can be opened at a time. In some embodiments only one of the four drawers can be opened at a time. In some embodiments the vending service unit includes at least one removable concession module, wherein each of the at least one removable concession modules removeably couples to the vending service unit body. In some embodiments the vending service unit includes a module locking bar, wherein the module locking bar removeably couples each of the at least one removable concession modules to the vending service unit body.

In some embodiments the counter comprises a first removable counter portion. In some embodiments a removable concession module that is mounted to the vending service unit body is prevented from being removed from the vending service unit body in response to the first removable counter portion being coupled to the vending service unit body. In some embodiments the vending service unit body includes a drawer opening, where the drawer opening receives one of the at least one drawers, and where an engine of the golf cart vehicle is accessible through the drawer opening in response to the one of the at least one drawers being removed from the drawer opening. In some embodiments the vending service unit body includes a water drain channel. In some embodiments one of the at least one drawers includes a rear overflow drain, where the water drain channel receives water that is released from the rear overflow drain.

Disclosed is a vending service unit that couples to a golf cart vehicle. The vending service unit according to the invention includes a vending service unit body. In some embodiments the vending service unit body includes a lower concession portion, where the lower concession portion includes a lower concession portion top surface. In some embodiments the vending service unit body includes an upper concession portion, where the upper concession portion couples to the lower concession portion top surface. In some embodiments the vending service unit body includes a counter mounted to the lower concession portion top surface. In some embodiments the vending service unit body includes a plurality of drawers, where each drawer opens out from beneath the counter, and where each drawer is removeably coupled to the lower concession portion.

In some embodiments the upper concession portion includes at least one removable concession module. In some embodiments the upper concession portion includes an upper convertible beverage service module, a removable module mounting frame, a first module locking bar coupled to the removable module mounting frame, and a second module locking bar coupled to the removable module mounting frame. The first and the second module locking bar couple each of the at least one removable concession modules to the vending service unit body. In some embodiments at least one of the plurality of drawers is thermally insulated. In some embodiments at least one of the plurality of drawers comprises a refrigeration unit. In some embodiments at least one of the plurality of drawers comprises a heating unit. In some embodiments the vending service unit includes a power source.

In some embodiments the lower concession portion includes a drawer slide coupled to the lower concession portion, and a slotted bar coupled to the lower concession portion. One of the plurality of drawers is operationally coupled to the drawer slide. The one of the plurality of drawers includes a drawer lock lever coupled to the one of the plurality of drawers, where the drawer lock lever rotates between a locked and an unlocked position. The one of the plurality of drawers also includes a drawer lock tab coupled to the drawer lock lever. The drawer lock tab extends into one of the plurality of slots in response to the drawer lock lever being in the locked position.

Disclosed is a method of mounting a vending service unit to a golf cart. The method of mounting a vending service unit to a golf cart according to the invention includes the steps of mounting a vending service unit body to the golf cart, mounting a counter to the vending service unit body, and mounting at least one drawer to the vending service unit body. In some embodiments the method of mounting a vending service unit to a golf cart according to the invention includes the step of removeably mounting a removable concession module to the vending service unit body. In some embodiments the step of removeably mounting a removable concession module to the vending service unit body includes the steps of placing a removable concession module on the vending service unit body, lowering a module locking bar against a top surface of the removable concession module, and locking the module locking bar in the lowered position, where the removable concession module is prevented from being removed from the vending service unit body in response to the module locking bar being locked in the lowered position. In some embodiments the method of mounting a vending service unit to a golf cart according to the invention includes the step of electrically coupling an upper concession module to a power source, where the power source does not supply power to the golf cart. In some embodiments the method of mounting a vending service unit to a golf cart according to the invention includes the step of electrically coupling an upper concession module to a power source, where the power source does not obtain power from the golf cart. In some embodiments the method of mounting a vending service unit to a golf cart or other vehicle according to the invention includes the step of electrically coupling an upper concession module to a power source, where the power source does obtain power from the golf cart. In some embodiments the method of mounting a vending service unit to a golf cart according to the invention includes the step of running a wiring harness through the vending service unit body. In some embodiments the method of mounting a vending service unit to a golf cart according to the invention includes the step of electrically coupling one of the at least one drawers to the wiring harness.

The foregoing and other features and advantages of the invention will be apparent to those of ordinary skill in the art from the following more particular description of the invention and the accompanying drawings.

DETAILED DESCRIPTION OF EMBODIMENTS OF THE INVENTION

Figure 1:
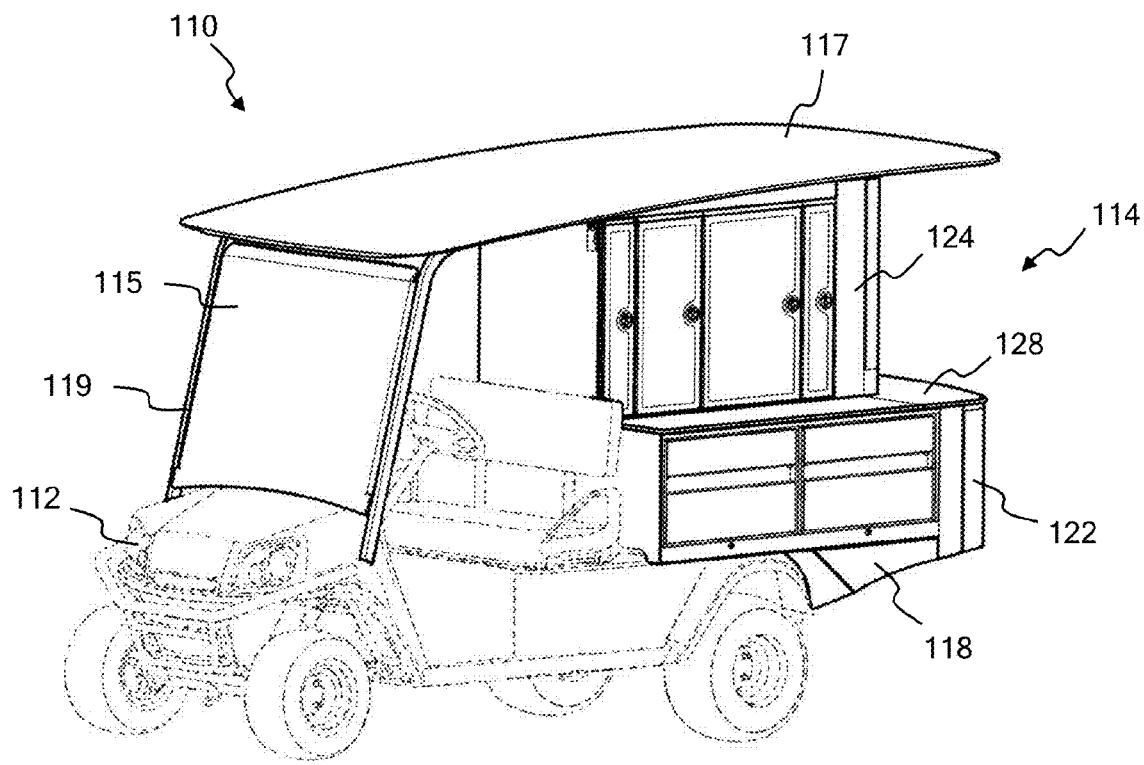
FIG. 1 is a front perspective view of an embodiment of golf cart with food and retail service features 110 according to the invention, where the golf cart with food and retail service features 110 includes one embodiment of vending service unit 114 according to the invention.

As discussed above, the disclosed invention relates to golf carts and in particular to a vending service unit that attaches to a golf cart for providing retail food, beverage and other retail service features from the golf cart.

Disclosed is a golf cart with food and retail service features. The golf cart with food and retail service features according to the invention includes a vending service unit that attaches to a golf cart vehicle. The vending service unit includes modules that allow hot and cold food and beverages to be stored and sold, and other retail items such as tobacco, golf supplies, and ice to be displayed and sold to golfers. Some of the vending service unit modules are removable concession modules that the vendor can easily and quickly replace and/or interchange, allowing the vending service unit to be reconfigurable and to offer a variety of different types of comestibles and other supplies. The disclosed vending service unit includes drawers that allow different types of food and beverage to be stored and sold conveniently and compactly. The drawers also include storage for consumable ice, also called food ice, for drinks. The drawers are individually insulated and can be individually heated or chilled for different food and beverage temperatures and types. A drain channel is included for draining excess water from the drawers. One or more of the drawers is removable to allow access to the golf cart engine or other mechanical and electrical parts, so that golf cart maintenance can be performed without removing the vending service unit. The disclosed vending service unit includes a counter surface that can be used to set items upon and on which to conduct business. The vending service unit also includes convenient trash and recycling bins. A power source can be includes in the vending service unit so that specific modules can be heated or cooled without drawing power from the golf cart. Additionally, the golf cart with vending service features can include a stylish canopy and windshield, and the vending service unit has surfaces that can be used for branding, advertising and marketing logos. In some embodiments the vending service unit can be attached to other vehicles or mobile units to provide vending services for venues and clients other than golf courses and golfers.

Golfing is a popular sport in the United States as well as worldwide. Each golfer spends approximately an hour to several hours on the golf course for each golf outing. Golfers are willing to pay for food, beverages, and other retail items that they want or need for their golf game, or that will make their golf game more enjoyable. Each golf course has one or more clubhouse(s) where food and supplies can be purchased, but the golfers usually have to leave the golf course to visit the clubhouse. Retail buildings can be strategically placed on the golf course, but this adds to the cost of the golf course itself and upsets the flow and design of a golf course. Golfers do not want to leave the golf course to obtain supplies, so it makes sense to provide a mobile unit that travels to the golfers on the golf course to provide supplies for them.

Units have been previously available that provide vending capabilities to golf carts and similar vehicles, but they have many drawbacks and limitations. The food storage areas are not compartmentalized and food and drinks tend to get mixed up in them, with areas that are hard to access. There is no area specifically for consumable ice, so the vendor usually ends up having to carry an extra ice chest somewhere else for consumable ice. The compartments are not reconfigurable or easily removable. The whole vending unit needs to be removed to access or service the golf cart. And the vending units do not have their own power source. There is a need for a reconfigurable vending unit specifically designed for golf carts and other small off-road vehicles that is able to provide mobile vending services.

Figure 2:
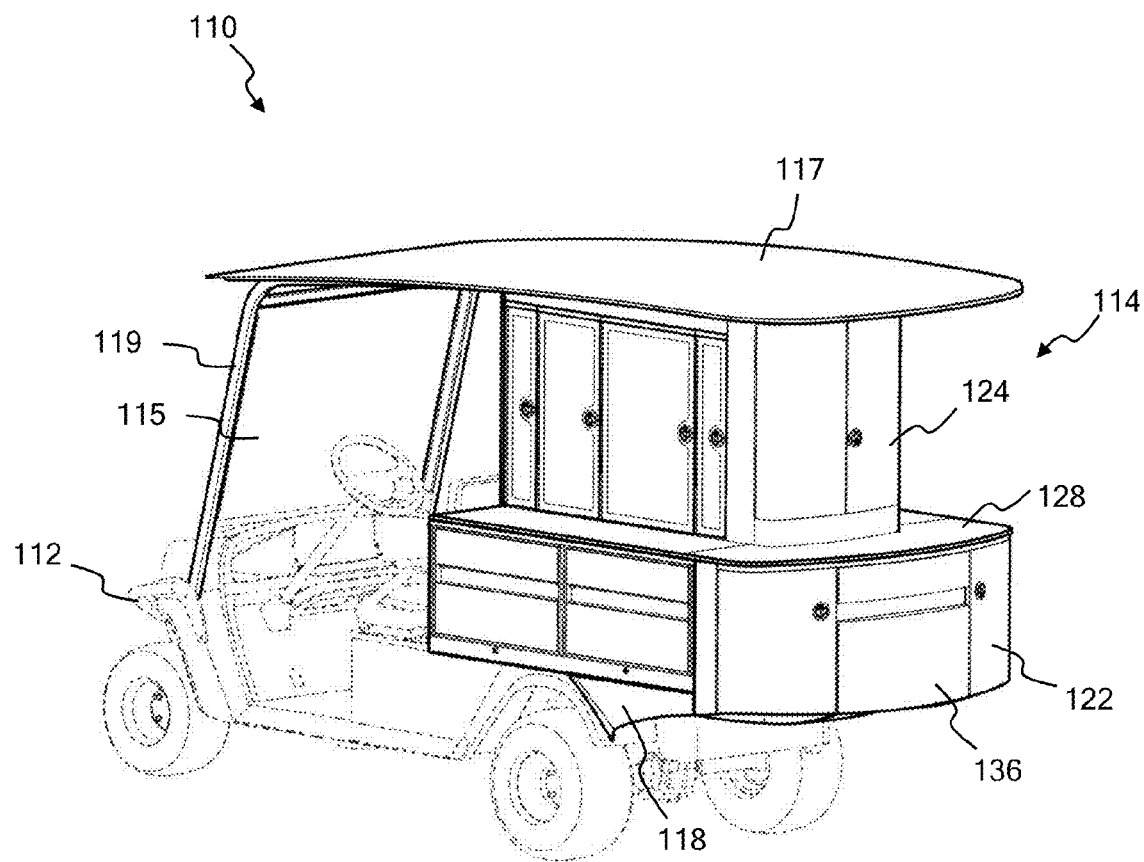
FIG. 2 is a rear perspective view of golf cart with food and retail service features 110 of FIG. 1.
Figure 3:
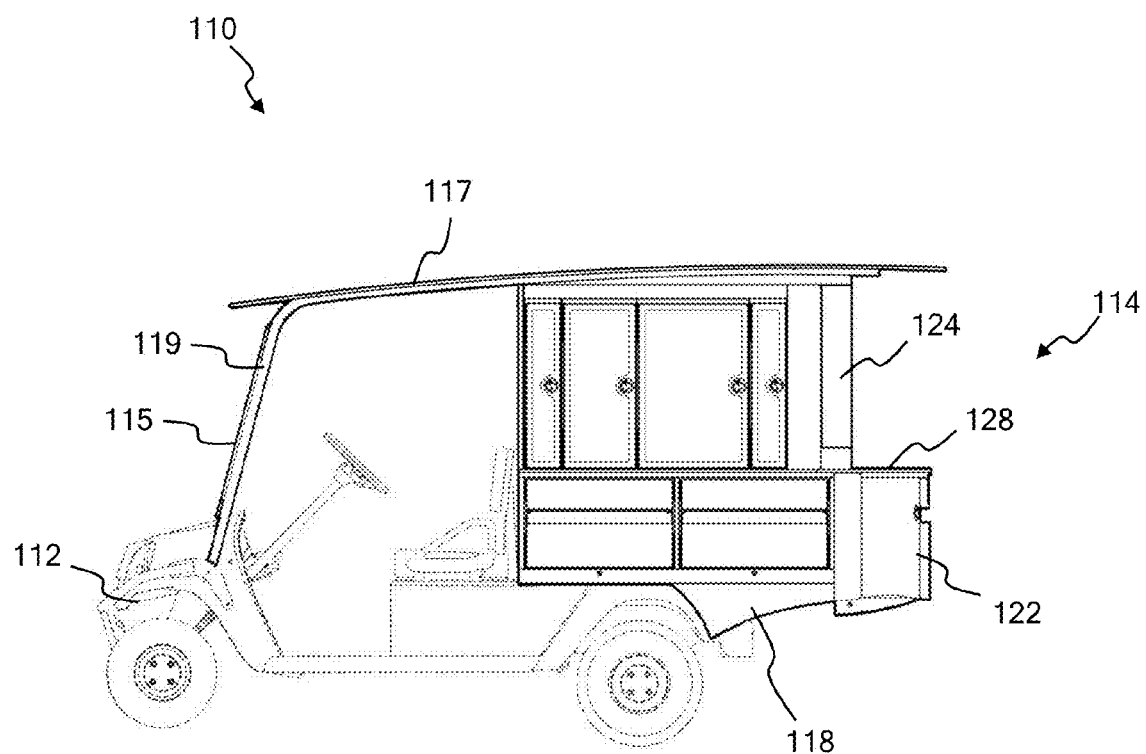
FIG. 3 is a side view of the golf cart with food and retail service features 110 of FIG. 1.
Figure 4:
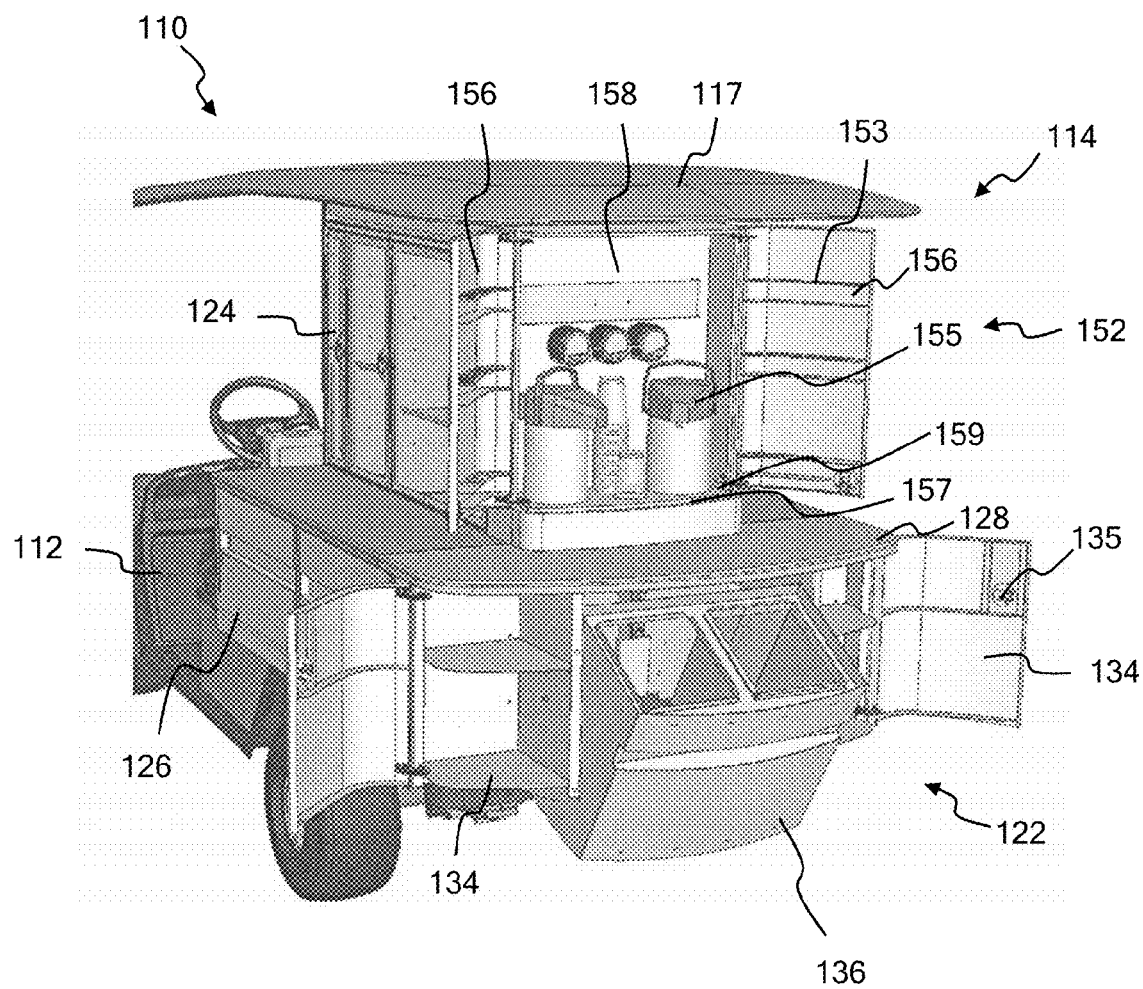
FIG. 4 is a rear perspective view of the vending service unit 114 according to the invention of FIG. 1.

FIG. 1 through FIG. 4 show the golf cart with food and retail service features 110 according to the invention. FIG. 1 shows a front perspective view of an embodiment of golf cart 110 according to the invention. FIG. 2 shows a rear perspective view of golf cart 110 according to the invention. FIG. 3 shows a side view of golf cart 110 according to the invention. FIG. 4 shows a rear perspective view of golf cart with food and retail service features 110 of FIG. 1, with several of the retail service compartments and modules open. Golf cart with food and retail service features 110 (also called vending golf cart 110 golf cart 110) according to the invention includes golf cart vehicle 112 and vending service unit 114 according to the invention. Vending service unit 114 according to the invention is shown in one embodiment in the figures. Golf cart vehicle 112 is an example of the type of golf cart 112 that vending service unit 114 can be coupled to. Golf cart vehicle 112 is shown in dotted lines is some figures to indicate that golf cart vehicle 112 can be any type of golf cart vehicle, not just the example type shown in the figures. Golf cart vehicle 112 becomes golf cart with food and retail vending services 110 according to the invention once vending service unit 114 according to the invention is coupled to golf cart vehicle 112. Vending service unit 114 couples to golf cart vehicle 112 to transform golf cart vehicle 112 into a mobile vending and services vehicle. Vending service unit 114 gives golf cart vehicle 112 the capability for mobile food, beverage and other vending services. Vending service unit 114 includes units and modules designed to allow efficient and easy vending of different types of food and beverages, including reconfigurable hot and cold modules, as well as space to store and vend non-food items.

Golf cart with food and retail service features 110 as shown in the drawings also includes canopy 117, windshield 115, and frame 119. Vending service unit 114 is coupled to golf cart vehicle 112. In the embodiment shown, vending service unit 114 is coupled to the rear part of golf cart vehicle 112, preferably coupled to the frame of golf cart vehicle 112 for stability. Frame 115 is coupled to golf cart vehicle 112 and vending service unit 114. Frame 115 provides a structure to mount windshield 115 and canopy 117 to. Canopy 117 is coupled to frame 115 and vending service unit 114. Canopy 117 provides protection from wind, sun, and golf balls to users of golf cart 110. Windshield 115 provides a wind barrier when driving golf cart 110.

Figure 5:
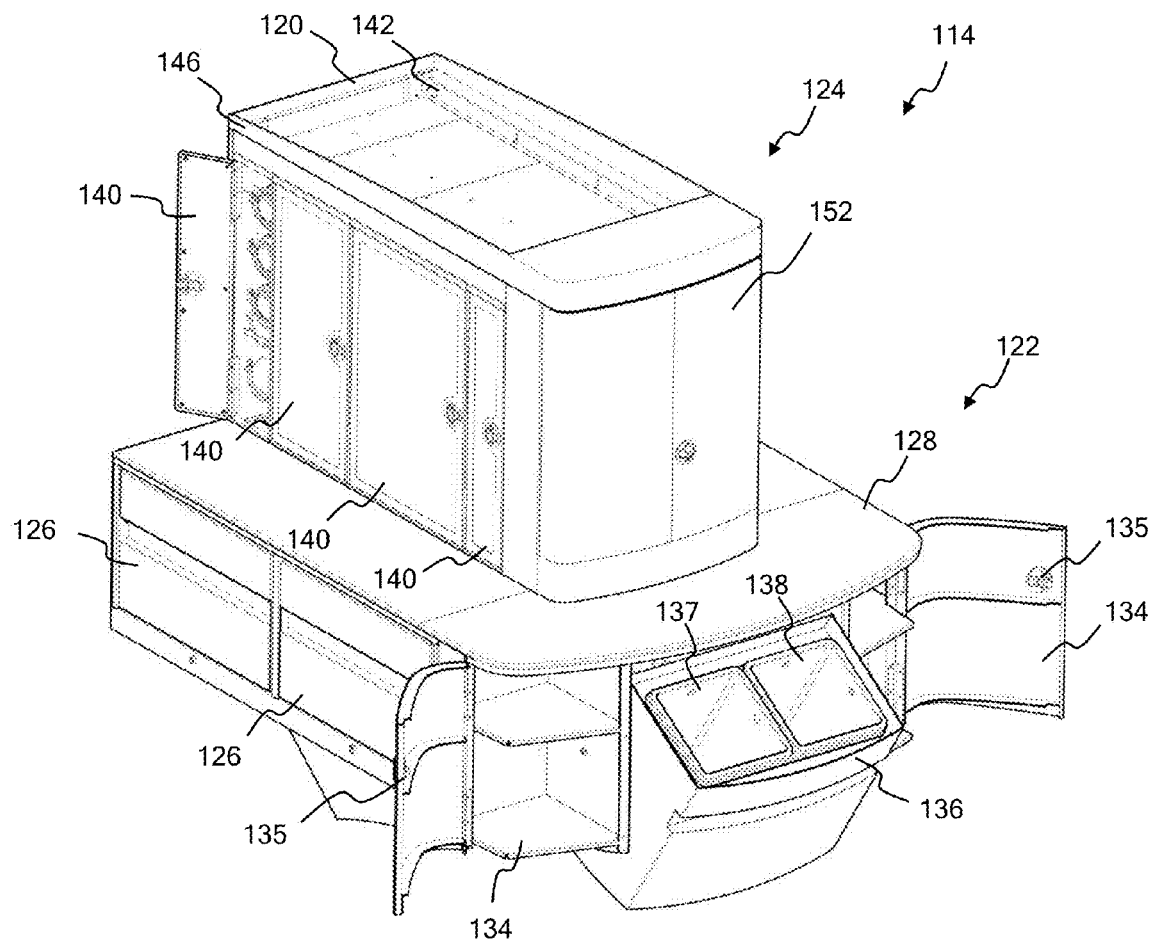
FIG. 5 is a rear perspective view of the vending service unit 114 according to the invention of FIG. 1.
Figure 6:
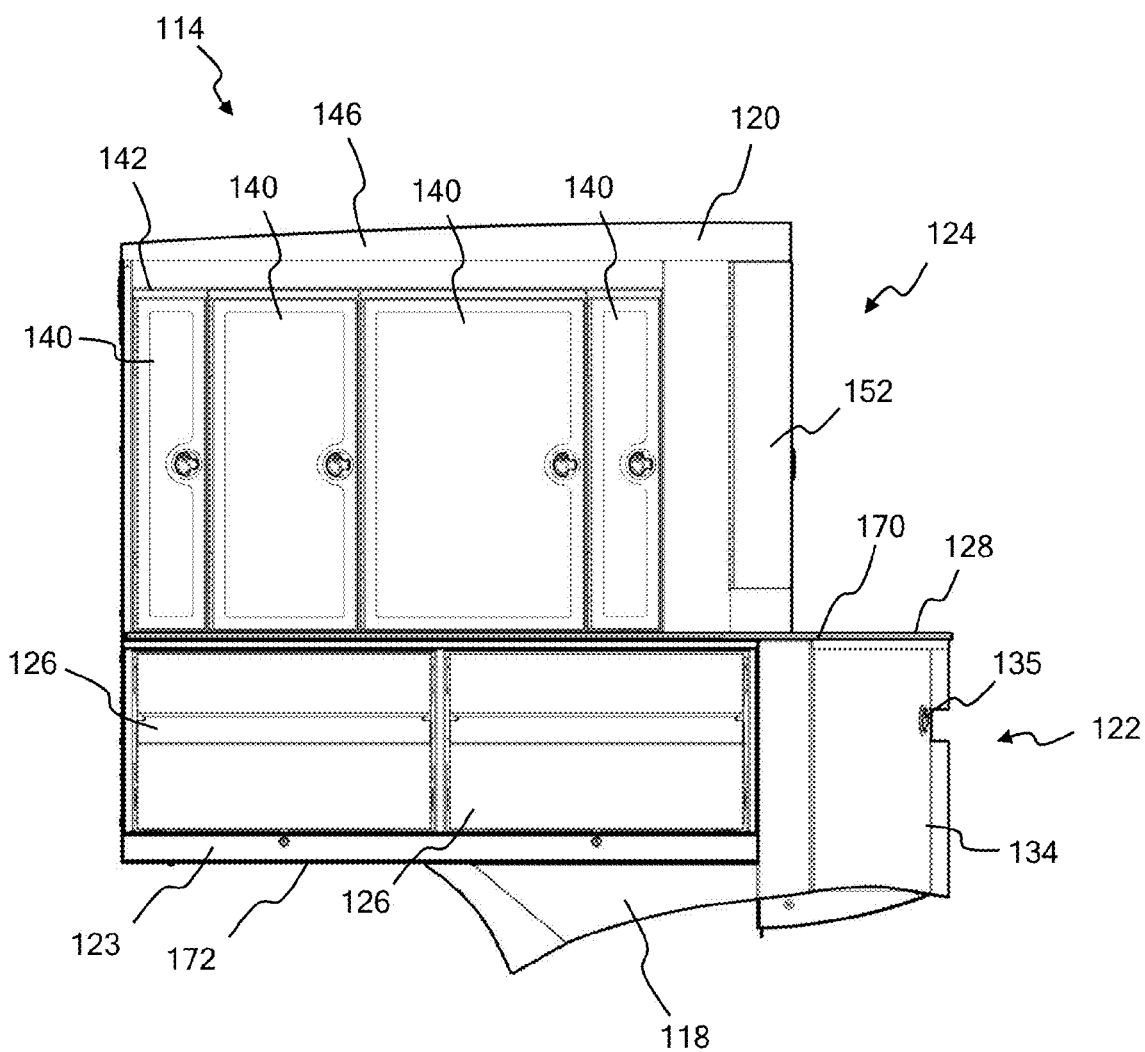
FIG. 6 is a side view of the vending service unit 114 of FIG. 1
Figure 7:
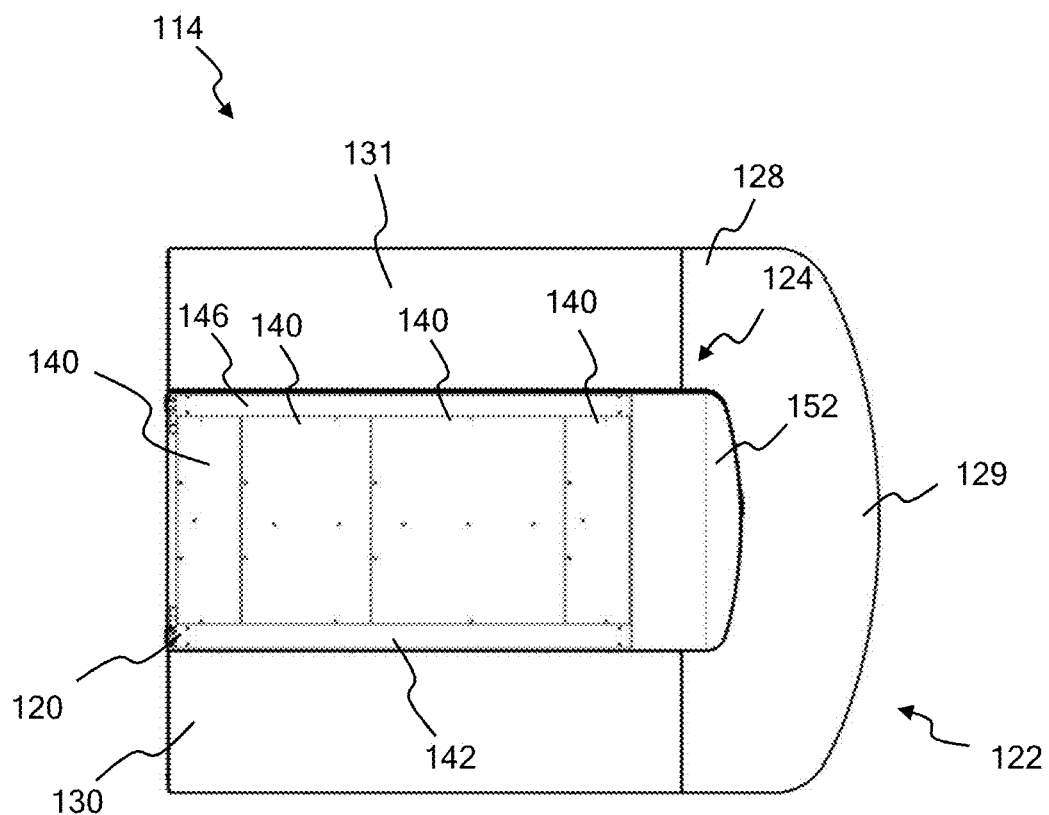
FIG. 7 is a top view of the vending service unit 114 of FIG. 1.
Figure 8:
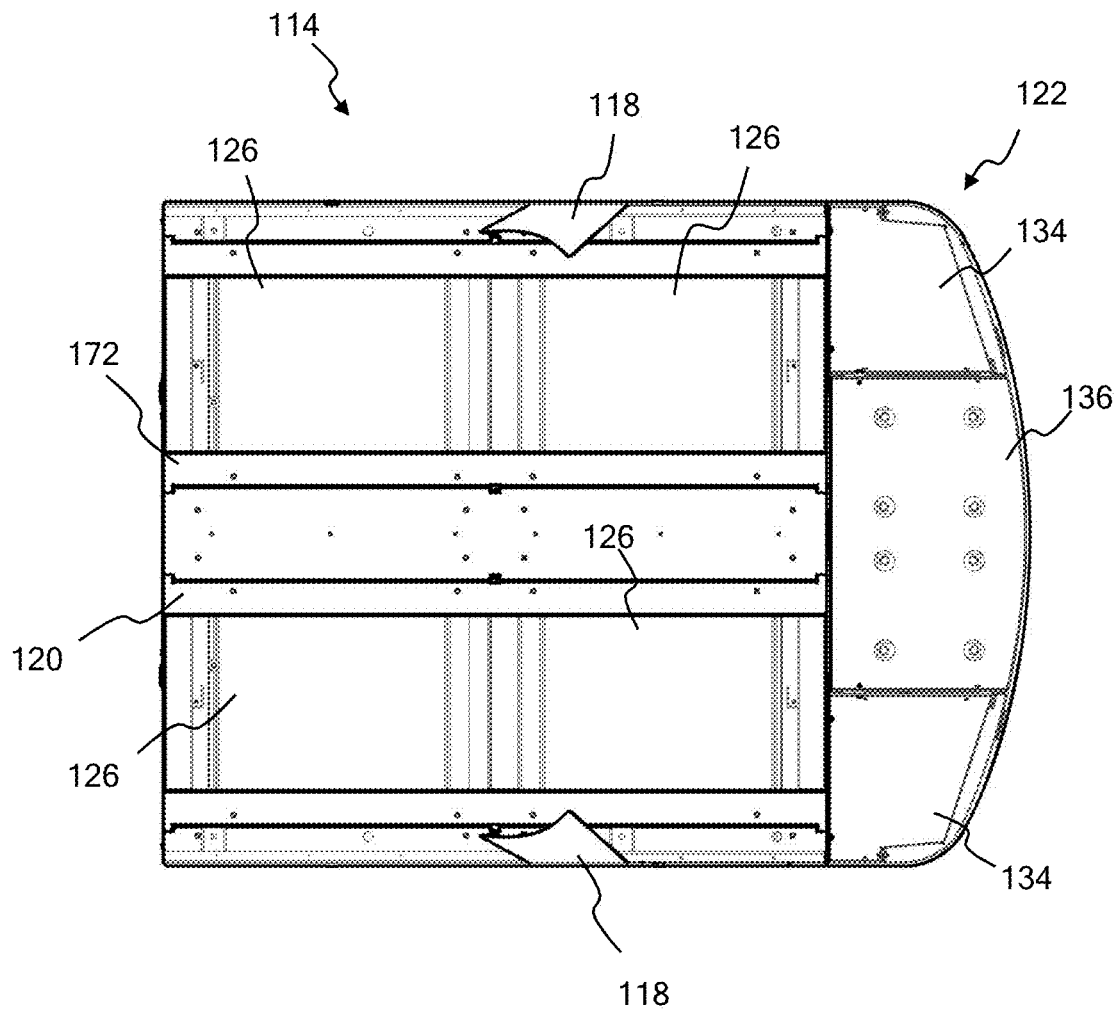
FIG. 8 is a bottom view of the vending service unit 114 of FIG. 1
Figure 11:
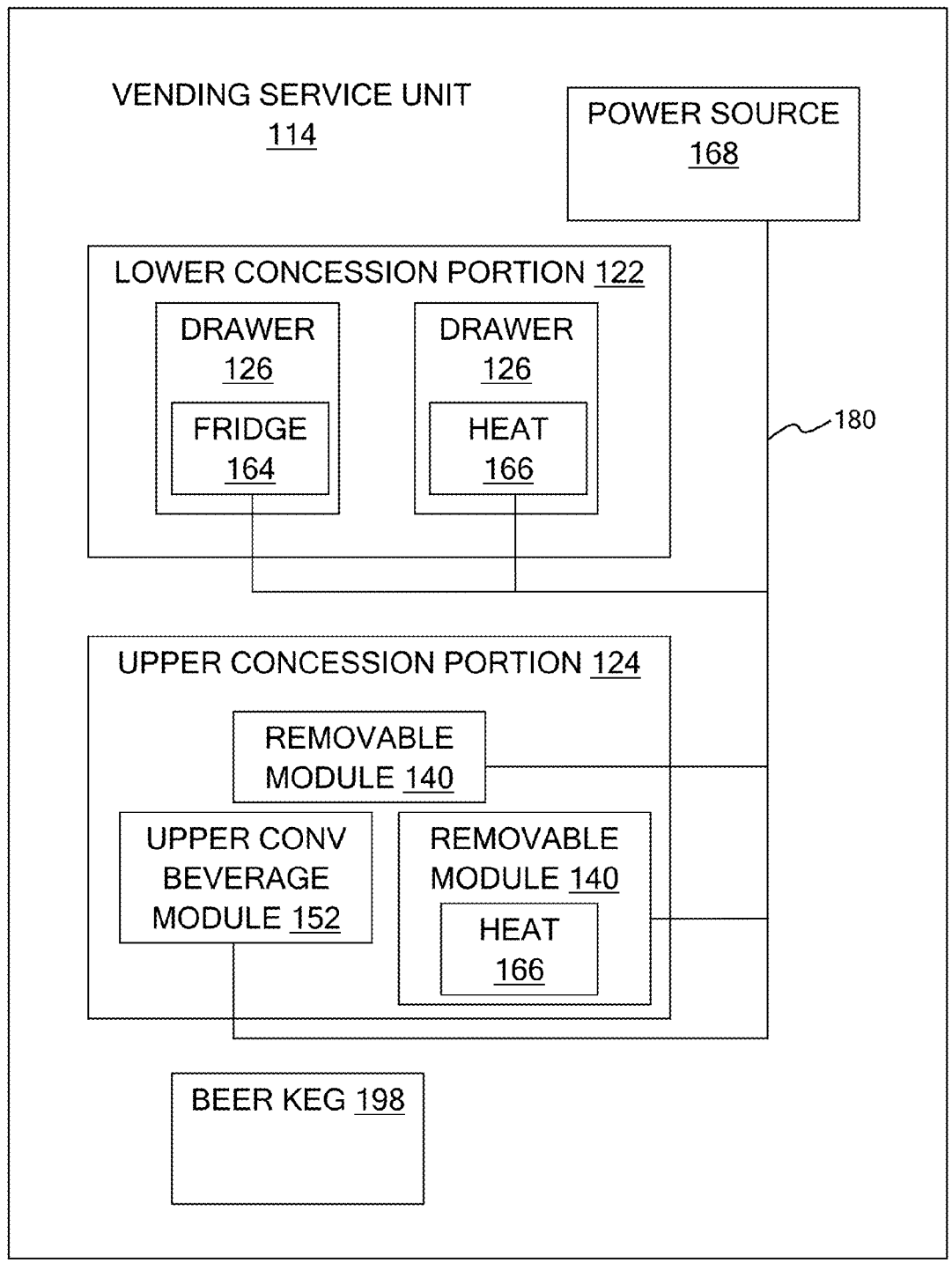
FIG. 11 is a block diagram of one embodiment of the vending service unit 114 according to the invention.

FIG. 5 through FIG. 8 shows views of the embodiment of vending service unit 114 according to the invention shown in FIG. 1 through FIG. 4. FIG. 5 shows a rear perspective view of vending service unit 114 according to the invention, with some of the modules opened. FIG. 6 shows a side view of vending service unit 114 of FIG. 5. FIG. 7 shows a top view of vending service unit 114 of FIG. 5. FIG. 8 shows a bottom view of vending service unit 114 of FIG. 5. FIG. 11 shows a block diagram of vending service unit 114, showing some of the elements of vending service unit 114. Vending service unit 114 includes the modules and compartments needed to store, transport and market food and beverages using golf cart vehicle 112. It is to be understood that vending service unit 114 according to the invention can take many forms other than the example embodiment shown in the figures.

Vending service unit 114 includes upper concession portion 124 and lower concession portion 122. Lower concession portion 122 couples to golf cart vehicle 112. Lower concession portion 122 includes lower concession portion top surface 170 and lower concession portion bottom surface 172 (FIG. 6, FIG. 8, FIG. 12, and FIG. 13). Lower concession portion bottom surface 172 is coupled to golf cart vehicle 112 by any suitable means. Lower concession portion bottom surface 172 can be coupled to golf cart vehicles using bolts, screws, or other suitable coupling means. Upper concession portion 124 sets on top of and couples to lower concession portion top surface 170, surrounded by counter 128. Counter 128 provides a convenient flat and substantially horizontal surface for transacting business, setting items on, or using as an eating surface. Counter 128 divides lower concession portion 122 from upper concession portion 124. Counter 128 is coupled to vending service unit body 120 above drawers 126, as will be discussed in more detail shortly. Drawers 126 open out from beneath counter 128. Vending service unit 114 also includes skirt 118. Skirt 118 protects vending service unit 114 from damage from dirt and rocks thrown up by the tires of golf cart vehicle 112. Skirt 118 also adds to the visual appeal of golf cart 110.

Figure 12:
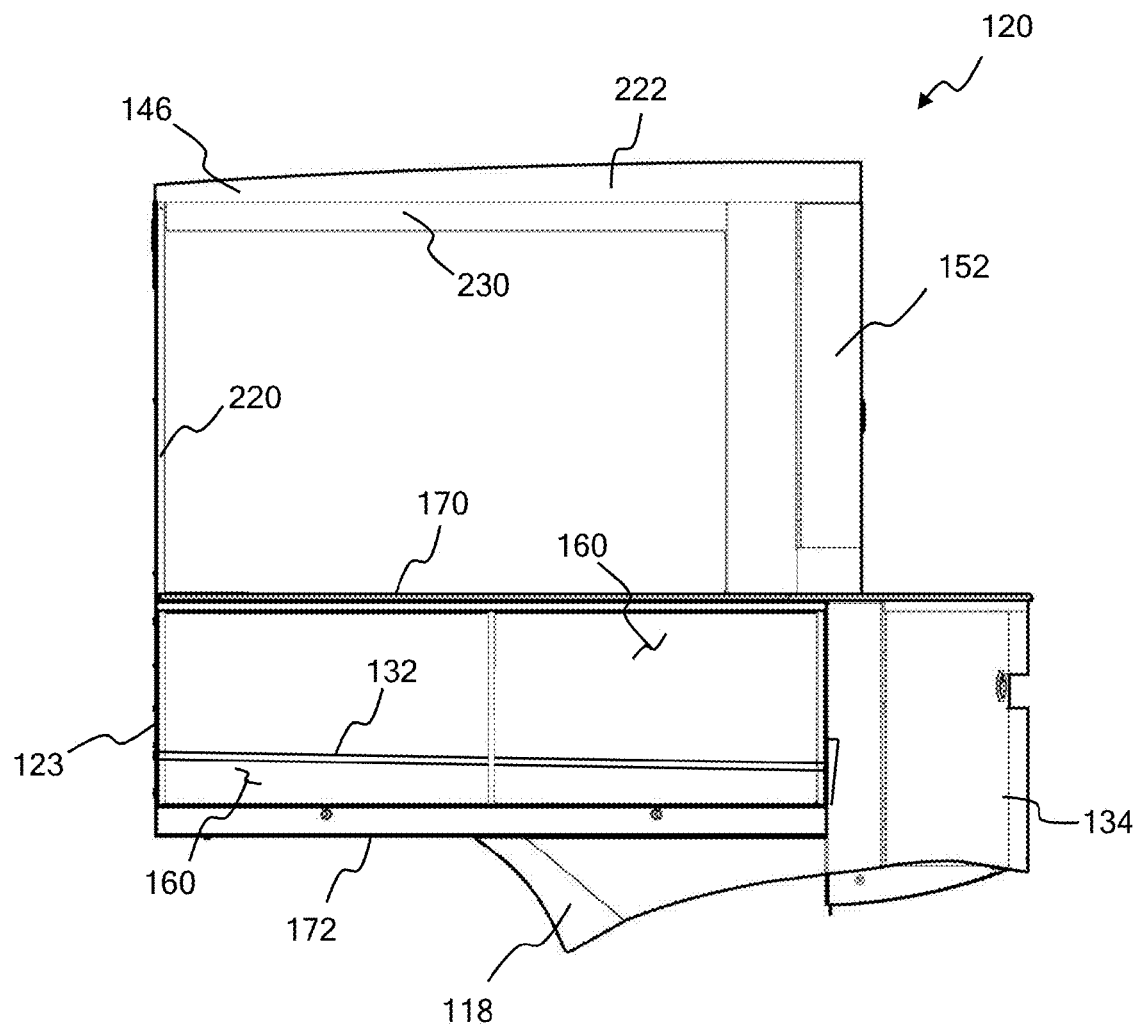
FIG. 12 is a side view of an embodiment of vending service unit body 120 according to the invention.

Upper concession portion 124 includes at least one fixed concession module and at least one removable concession module 140. In the embodiment shown, upper concession portion 124 includes one fixed concession module: convertible beverage service module 152. Convertible beverage service module 152 is a part of vending service unit body 120 (FIG. 12). In the embodiment shown, upper concession portion 124 includes four removable concession modules 140. Removable concession modules 140 can be repeatably coupled to and removed from vending service unit body 120, as will be discussed in more detail shortly. Removable concession modules 140 can be interchanged with modules of other sizes and configurations to provide the ability for the vendor to customize vending service unit 114, as well as modify vending service unit 114 to different events, times of day, or particular customers. Removable concession modules 140 are coupled to vending service unit body 120 using at least one module locking bar 142 and counter 128, as will be discussed in more detail shortly.

Lower concession portion 122 includes at least one drawer 126. In the embodiment shown lower concession portion 122 includes four drawers 126. In this embodiment only one of the four drawers 126 can be opened at a time. This provides the vendor security in knowing that multiple drawers cannot be opened by customers, as well as keeping drawers from opening when driving or parked on uneven surfaces.

Figure 9:
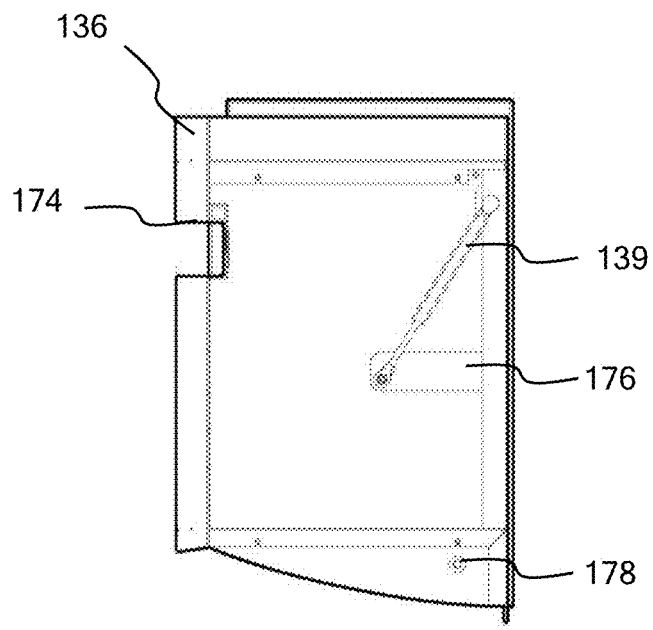
FIG. 9 is a side cutaway view of an embodiment of refuse compartment 136 according to the invention, with refuse compartment 136 in a closed position.
Figure 10:
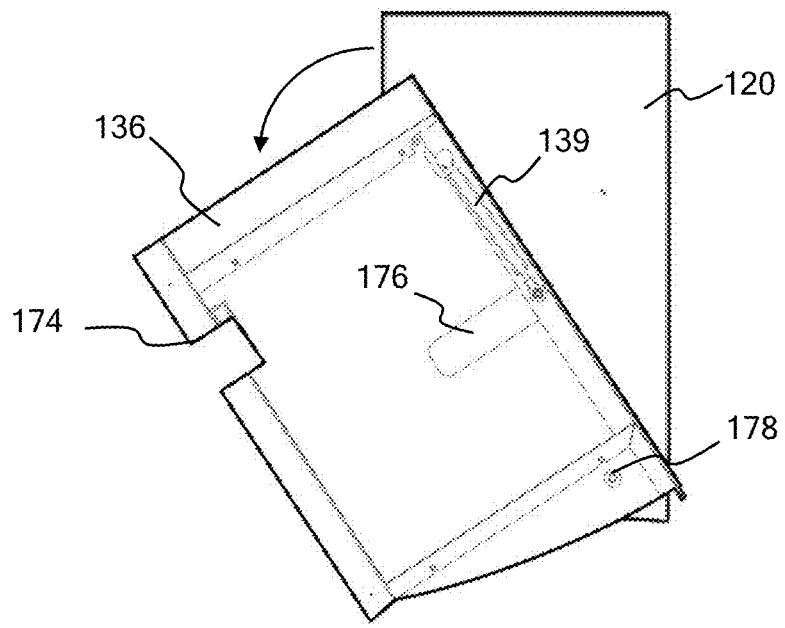
FIG. 10 is a side cutaway view of refuse compartment 136 of FIG. 9, with refuse compartment 136 in an open position.

Lower concession portion 122 also includes lower storage compartments 134, and refuse compartment 136. In this embodiment lower storage compartments 134 are each locked with locks 135. Lockable lower storage compartments 134 provide a place where the vendor can lock valuables such as money, a wallet or purse, or valuable retail items to keep them secure. Refuse compartment 136 is used for garbage and trash in this embodiment. In this embodiment refuse compartment 136 includes two separate containers, which can be used to divide trash from recyclables, for example. In this embodiment refuse compartment 136 includes trash compartment 137 and recyclable compartment 138 (FIG. 5). Trash compartment 137 is a separate compartment from recyclable compartment 138, so the items put in either compartment are kept separate. Refuse compartment 136 is rotatably coupled to refuse compartment mounting point 178 of vending service unit body 120, as shown in FIG. 9 and FIG. 10. Refuse compartment 136 rotates about refuse compartment mounting point 178 to open and close, as shown in FIG. 9 and FIG. 10. In this embodiment refuse compartment 136 is moveably coupled to vending service unit body 120 using at least one air cylinder 139 as shown in FIG. 9 and FIG. 10. Air cylinder 139 tiltably couples refuse compartment 136 to vending service unit body 120. Air cylinder 139 is coupled at one end to refuse compartment 136, and at the other end to cylinder mounting bar 176. Air cylinder 139 allows refuse compartment 136 to tilt outwards to receive trash and recyclables, as shown in the figures, and to tilt back in to store refuse compartment 136. Air cylinder 139 restricts the motion of refuse compartment 136 considerably. When refuse compartment 136 is stowed (FIG. 2 and FIG. 9), air cylinder 139 keeps refuse compartment 136 from falling open. When refuse compartment handle 174 is pulled on to open refuse compartment 136, refuse compartment 136 tilts open (FIG. 4, FIG. 5, and FIG. 10). When refuse compartment 136 is open, air cylinder 139 keeps refuse compartment 136 from tilting closed until refuse compartment 136 is pushed close. Air cylinder 139 prevents refuse compartment 136 from opening and closing when travelling over uneven surfaces, for example.

FIG. 11 shows a block diagram of an embodiment of vending service unit 114 according to the invention. In this embodiment vending service unit 114 includes power source 168. Power source 168 does not provide power to golf cart vehicle 112, or receive power from golf cart vehicle 112, but is instead separate from the power source of golf cart vehicle 112. In the past, vending boxes that have been attached to mobile vehicles received their power from the vehicle power source. But this is a problem because there is often not enough power to power both vehicle 112 and the vending box. Thus vending service unit 114 includes its own power source 168. In this embodiment power source 168 does not obtain power from golf cart vehicle 112. In some embodiments power source 168 is recharged by golf cart vehicle 112. In some embodiments power source 168 can recharge golf cart vehicle 112.

In the embodiment shown in FIG. 11, power source 168 delivers power, and in some embodiments signals, to elements of vending service unit 114 via wiring harness 180. In this embodiment power source 168 provides power to two drawers 126 of lower concession portion 122, to upper convertible beverage module 152, and to removable concession modules 140 of upper concession portion 124. Lower concession portion 122 is electrically coupled to power source 168 using wiring harness 180. Upper concession portion 124 is electrically coupled to power source 168 using wiring harness 180. Drawers 126 are electrically coupled to power source 168 using wiring harness 180. Wiring harness 180 is run through vending service unit body 120 of vending service unit 114 to deliver power and signals to each of the elements that are electrically connected to wiring harness 180.

Drawers 126 are each individually insulated, so that one drawer 126 can hold warm or hot items, and another drawer 126 can hold cool or cold items. In this embodiment one drawer 126 includes a powered refrigeration unit 164 which receives power from power source 168. And in this embodiment another drawer 126 includes a powered heating unit 166 which receives power from power source 168. In this way the temperature of the individual drawers 126 can be individually and accurately controlled, without affecting the temperature of the neighboring drawers 126 or other modules, and without drawing power from golf cart vehicle 112.

In some embodiments upper concession portion 124 includes heating or refrigeration units that receive power and/or signals from power source 168 through wiring harness 180. In the embodiment shown in FIG. 11, one removable concession module 140 includes powered heating unit 166. In some embodiments vending service unit 114 includes other elements powered from power source 168.

Vending service unit 114 as shown in the embodiment of FIG. 11 also includes beer or wine keg 198. Beer or wine keg 198 provides convenient beer or wine vending services to customers of golf cart with retail service features 110 according to the invention.

Vending service unit 114 according to the invention includes vending service unit body 120 according to the invention, as shown in one embodiment in FIG. 12. FIG. 12 is a side view of vending service unit body 120 of vending service unit 114 of FIG. 5. Vending service unit body 120 is the basic structure that is mounted to golf cart vehicle 112. Vending service unit body 120 does not include the removable and interchangeable modules such as drawers 126 and removeably concession modules 140.

Vending service unit body 120 includes lower concession portion frame 123. Lower concession portion frame 123 includes lower concession portion top surface 170, lower concession portion bottom surface 172, and storage compartments 134. Vending service unit body 120 also includes water drain channel 132 which collects and drains excess water from drawers 126, as will be explained in more details shortly.

Vending service unit body 120 includes openings 160 for drawers 126. Drawers 126 are removable from vending service unit body 120. This is useful for servicing golf cart vehicle 112. The engine and other mechanical components of golf cart vehicle 112 are accessible and can be serviced through drawer openings 160 when one or more drawers 126 are removed. This makes golf cart vehicle 112 easily serviced without having to remove vending service unit 114. In the past, vending boxes for vehicles would need to be removed from the vehicle to perform service on the vehicle.

Vending service unit body 120 in this embodiment also includes removable module mounting frame 146, and upper convertible beverage service module 152 of upper concession portion 124, as shown in FIG. 12 through FIG. 17. In this embodiment upper convertible beverage service module 152 is a fixed, non-removable part of vending service unit body 120. In some embodiments of vending service unit body 120 according to the invention, upper convertible beverage service module 152 can be removed from, and is not a fixed part of, vending service unit body 120. Removable module mounting frame 146 and upper convertible beverage service module 152 connect to lower concession portion top surface 170 of vending service unit body 120, as shown in FIG. 12.

Upper convertible beverage service module 152 in the embodiment shown in the figures is for dispensing and/or vending beverages such as coffee or alcohol. Upper convertible beverage service module 152 can take many different forms and can be adapted to store, vend, or dispense many different types of products. It is to be understood that the example embodiment shown of upper convertible beverage service module 152 is an example only and not meant to be limiting. In the embodiment shown in the figures, upper convertible beverage service module 152 includes beverage compartment 158 and beverage doors 156, as shown in FIG. 4. Beverage doors 156 open and close to contain and store the beverages and beverage related items in upper convertible beverage service module 152.

Upper convertible beverage service module 152 in the embodiment shown in FIG. 4 includes convertible beverage tray 157. Convertible beverage tray 157 has a top and a bottom side with different sized openings in each to accommodate the different types of beverage that the vendor may want to offer at a particular time. In the embodiment shown, convertible beverage tray 157 includes top side 159 with openings sized to hold coffee carafes 155. Convertible beverage tray 157 can be flipped over so that the bottom side of convertible beverage tray 157 is used. The bottom side can have openings sized to fit wine bottles, for example, or other types of containers for mixed drinks. Thus convertible beverage tray 157 allows convertible beverage service module 152 to be easily configurable each day. In the morning convertible beverage service module 152 is easily configured to vend coffee, hot chocolate, and tea, for example. In the afternoon convertible beverage service module 152 can be easily converted to vend wine, alcohol, and/or mixed drinks, for example. In this way vending service unit 114 is easily and quickly customizable to vend the types of beverage desired at different events or different types of day, allowing the storage and vending space to be shared and not wasted at any particular time. Convertible beverage tray 157 can take many other forms. In the embodiment shown convertible beverage tray 157 includes openings for holding cups. Beverage doors 156 include bottle holder racks 153 that can hold alcoholic drink mixers, small bottles of alcohol, or other drink mixtures that are stored in small bottles or containers, for example.

Figure 13:
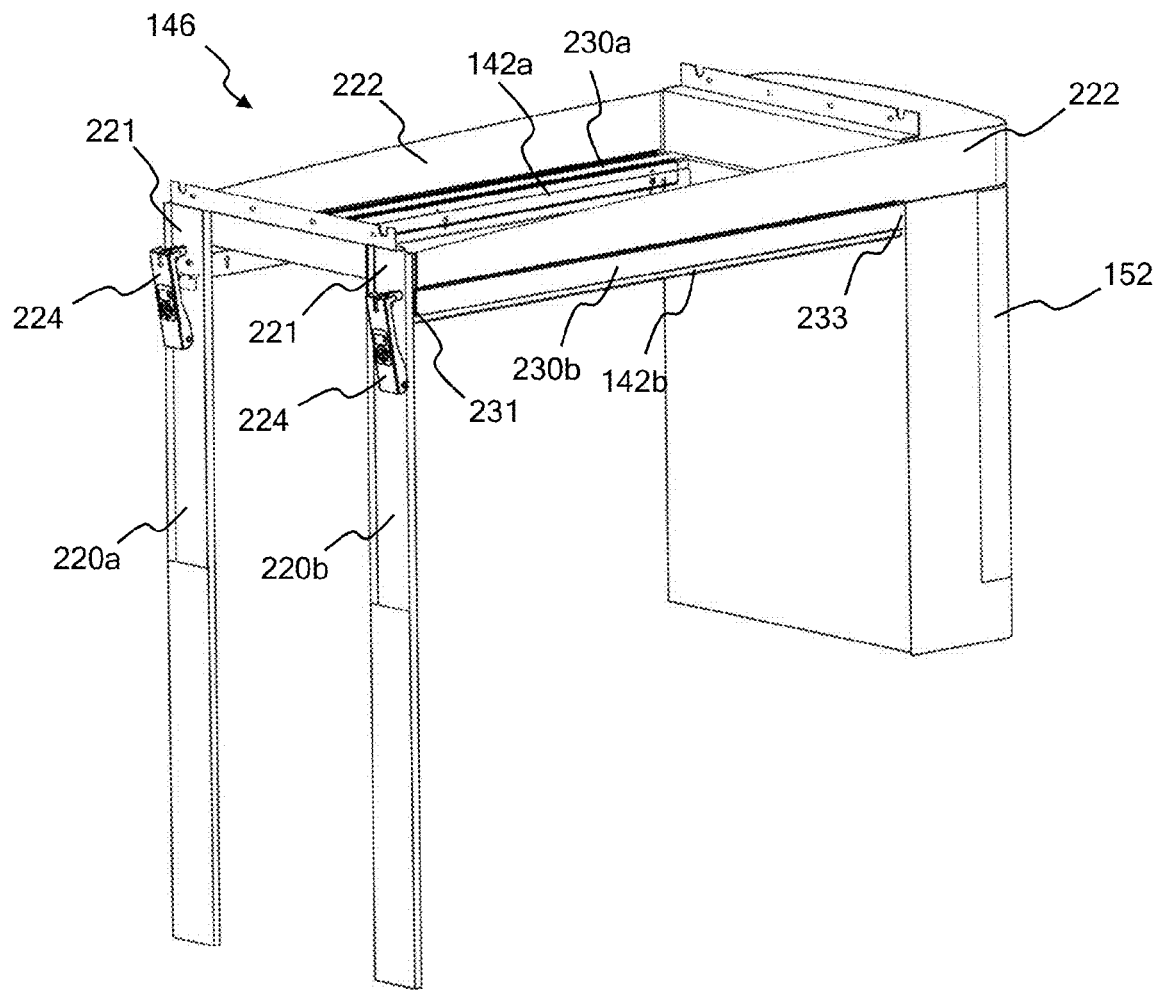
FIG. 13 is a front perspective view of an embodiment of upper concession portion 124 according to the invention, including first module locking bar 142a and second module locking bar 142b.
Figure 16:
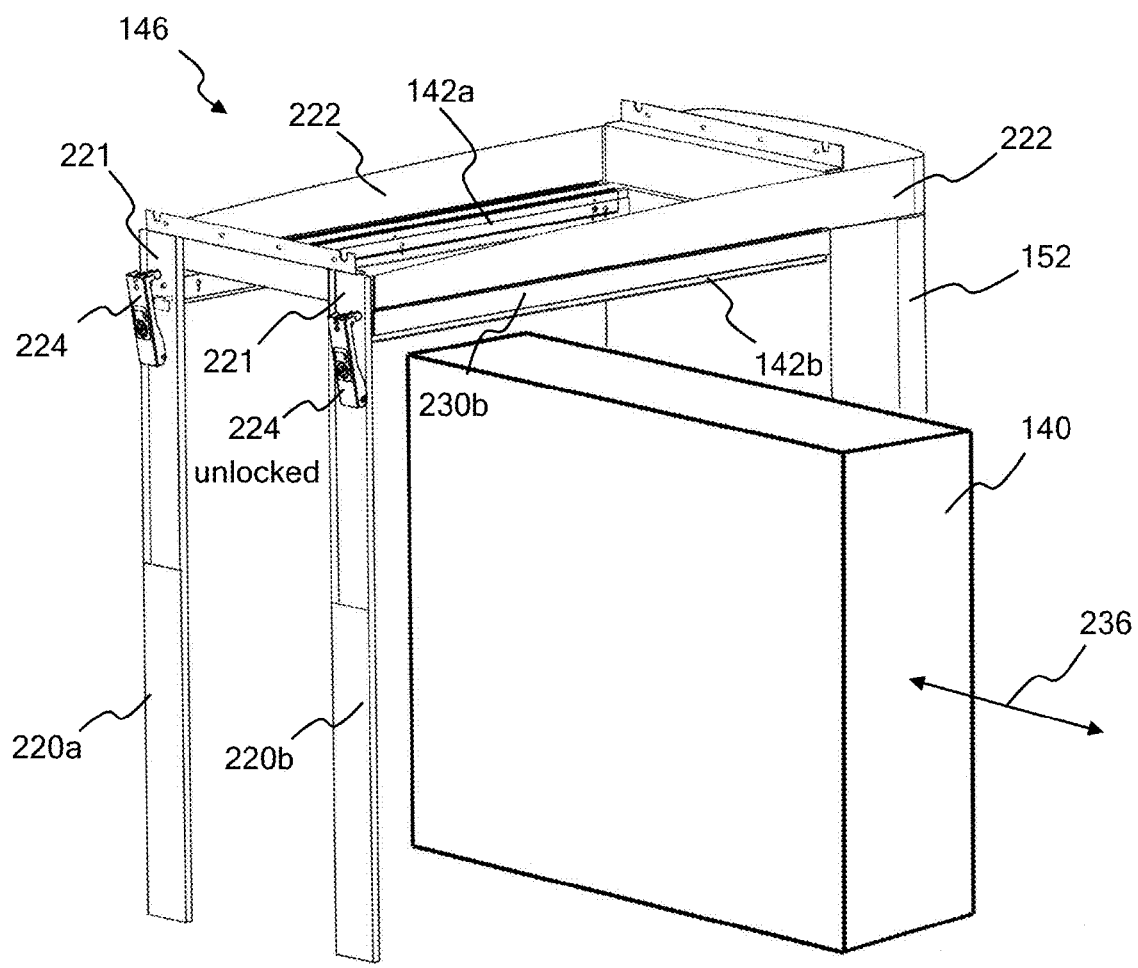
FIG. 16 is a front perspective view of upper concession portion 124 of FIG. 13, with bar lock 224 in the unlocked position, and module locking bars 142a and 142b in the raised position as shown in FIG. 14, such that removable concession modules 140 can be slid into and out of position on lower concession portion 122 of vending service unit body 120.
Figure 17:
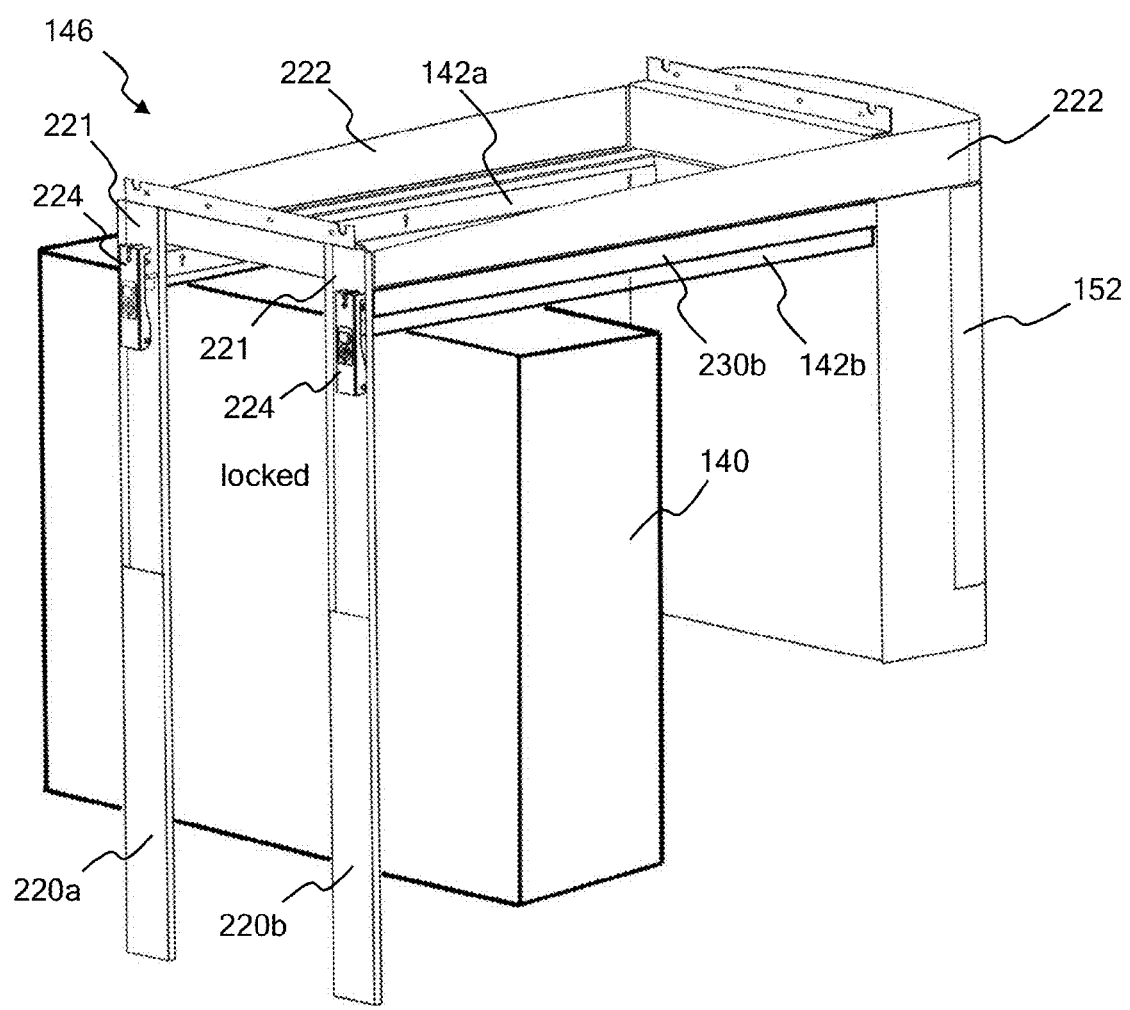
FIG. 17 is a front perspective view of upper concession portion 124 of FIG. 13, with bar lock 224 in the locked position, and module locking bars 142a and 142b locked in the lowered position as shown in FIG. 15, such that removable concession modules 140 are locked in position on lower concession portion 122 of the vending service unit body 120.

Vending service unit body 120 in this embodiment also includes removable module mounting frame 146. Removable module mounting frame 146 couples to lower concession portion frame 123 and to upper convertible beverage module 152, as shown in FIG. 12. Removable module mounting frame 146 is the frame that couples removable modules 140 to vending service unit 114, as shown in FIG. 13 through FIG. 17. Removable module mounting frame 146 includes fixed top bars 230 and frame front straps 220. Frame front straps 220 are coupled to lower concession portion frame 123 and extend vertically from lower concession portion frame 123, as shown in FIG. 12. Fixed top bars 230 are coupled between frame front strap 220 top end 221 and upper convertible beverage module 152, as can be seen in FIG. 12 through FIG. 17. Frame sides 222 provide an aesthetic blending between upper concession portion 124 and canopy 117. In this embodiment there are two each of fixed top bars 230, including fixed top bar 230a and 230b, and two each of frame front straps 220, including frame front straps 220a and 220b, as shown in FIG. 13, FIG. 16, and FIG. 17, but this is not meant to be limiting.

Figure 14:
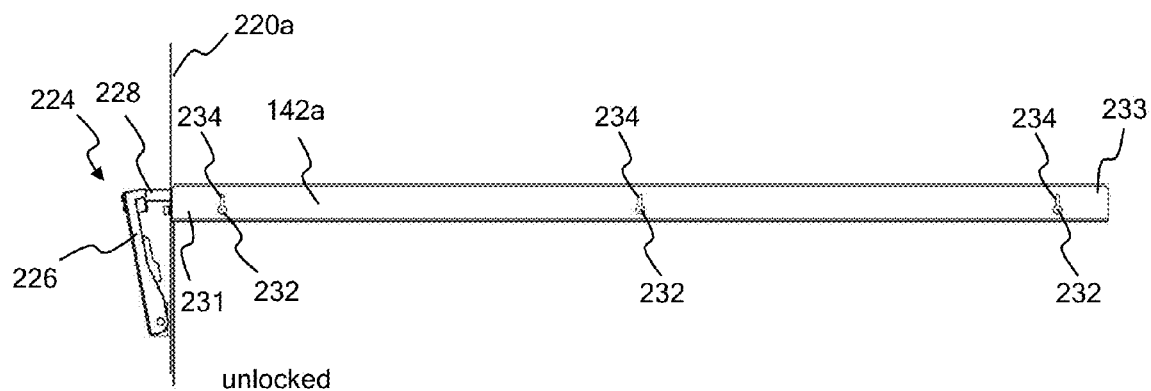
FIG. 14 is a side view of an embodiment of module locking bar 142 and bar lock 224, with bar lock 224 in the unlocked position, and module locking bar 142 in the raised, or unlocked, position.
Figure 15:
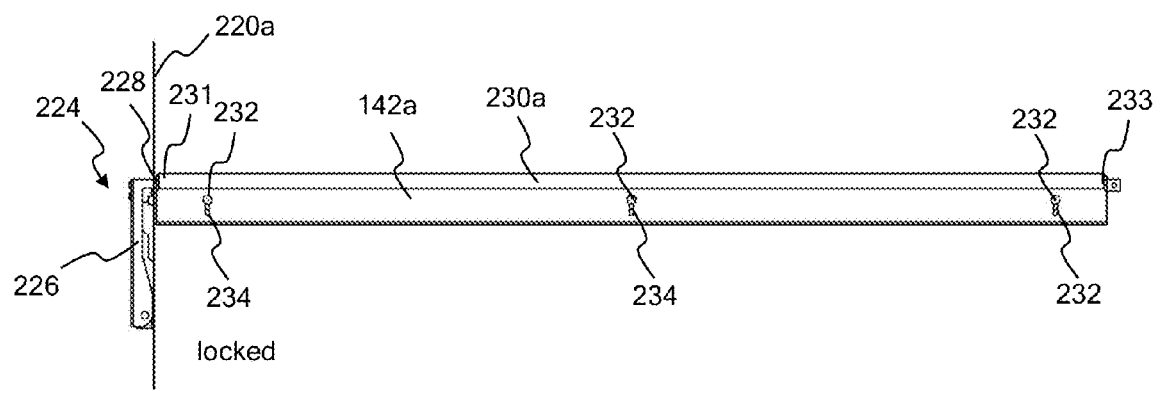
FIG. 15 is a side view of module locking bar 142 and bar lock 224 of FIG. 14, with bar lock 224 in the locked position and module locking bar 142 locked in the lowered position.

Fixed top bars 230 each hold a corresponding module locking bar 142, as shown in FIG. 14 and FIG. 15. In this embodiment fixed top bar 230a holds module locking bar 230a, and fixed top bar 230b holds module locking bar 230b. Each module locking bar 142 raises and lowers in order to lock and release removable concession modules 140 to vending service unit body 120, as shown in FIG. 14 through FIG. 17. FIG. 14 and FIG. 15 is a side view of module locking bar 142a coupled to fixed side bar 220a, showing how module locking bar 142a raises and lowers on fixed side bar 230a. FIG. 14 shows module locking bar 142a in the raised position (fixed side bar 230a is hidden behind module locking bar 142a in this figure). FIG. 15 shows module locking bar 142a in the lowered position. Fixed side bar 230a is coupled to frame front strap 220a at side bar first end 231 (FIG. 13 and FIG. 15). Fixed side bar 230a is coupled to convertible beverage service module 152 at side bar second end 233 (FIG. 13 and FIG. 15). Module locking bar 142a is coupled to fixed side bar 230a using bar mount pins 232, which extend through bar slots 234 in module locking bar 142a to slidably couple module locking bar 142a to fixed side bar 230a.

Bar lock lever 226 is used to lock module locking bar 142 in the locked or lowered position. Bar lock lever 226 moves between a locked and an unlocked position, as shown in FIG. 14 and FIG. 15. Bar lock lever 226 moves bar lock pin 228 between a locked and an unlocked (extended) position. FIG. 14 shows bar lock lever 226 and bar lock pin 228 in the unlocked position. FIG. 15 shows bar lock lever 226 and bar lock pin 228 in the locked position. When bar lock lever 226 and bar lock pin 228 are in the locked position, module locking bar 142a is locked in the lowered position as shown in FIG. 15, and cannot be raised without unlocking bar lock lever 226. Locking module locking bar 142a in the lowered position is used to couple removable concession modules 140 to vending service unit body 120, as shown in FIG. 16 and FIG. 17. When bar lock lever 226 and bar lock pin 228 are in the unlocked position, module locking bar 142a is not locked in the lowered position. When module locking bar 142a is not locked in the lowered position, it can be slidably raised and lowered on bar mount pins 232, as shown in FIG. 14. Module locking bar 142b is similarly locked in position with its corresponding bar lock lever 226. When module locking bar 142a and 142b are not locked in position, removable concession modules 140 can be removed, interchanged, and slid into place on vending service unit body 120, as shown in FIG. 16. Thus module locking bar 142 couples removable concession modules 140 to vending service unit 114 in the embodiment of vending service unit 114 shown in the figures. In this embodiment removable module mounting frame 146 includes first and second module locking bars 142a and 142b. First module locking bar 142a is coupled to removably module mounting frame 146. Second module locking bar 142b is coupled to removable module mounting frame 146. First and second module locking bars 142a and 142b couple each of at least one removable concession modules 140 to vending service unit body 120.

In the embodiment of vending service unit 114 shown in the figures, removable concession modules 140 removeably couple to vending service unit body 120, as shown in FIG. 16 and FIG. 17. In the embodiment shown in FIG. 1 through FIG. 7, four removable concession modules 140 are removeably coupled to vending service unit body 120. Each removable concession module 140 is positioned between upper convertible beverage service module 152 and frame front straps 220, as shown in FIG. 12. Once removable concession modules 140 are set in place on lower concession portion upper surface 170, removable concession modules 140 can be locked in place on lower concession portion top surface 170. In the embodiment shown in the drawings, removable concession modules 140 are locked in place in two ways.

The first way that removable concession modules 140 are locked in place on vending service unit body 120 is with module locking bar 142. At least one module locking bar 142 is locked over the top of removable concession modules 140 so that removable concession modules 140 are held in place from above, as shown in FIG. 15 and FIG. 17. Removable concession module locking bar 142 keeps removable concession modules 140 from moving sideways. Removable concession modules 140 that are in position on lower concession portion top surface 170 are locked in place in response to module locking bars 142a and 142b being locked in the lowered position, as shown in FIG. 15 and FIG. 17. Module locking bars 142 are locked in the lowered position in response to bar lock levers 224 and bar lock pins 228 being placed in the locked position. In this way removable concession module 140 is coupled to vending service unit body 120 of vending service unit 114 in response to module locking bars 142 being locked in the lowered position. Each module locking bar 142 is locked in the lowered position in response to bar lock lever 224 and bar lock pin 228 being placed in the locked position.

FIG. 14 and FIG. 16 show how removable concession modules 140 can be removed from vending service unit 114 in response to module locking bars 142 being in the unlocked position. When bar lock lever 224 and bar lock pin 228 are in the unlocked position, module locking bar 142 is free to slidably move up and down on bar mount pin 232, and removable concession modules 140 can be removed or added to vending service unit 114, as shown in FIG. 14 and FIG. 16.

Figure 18:
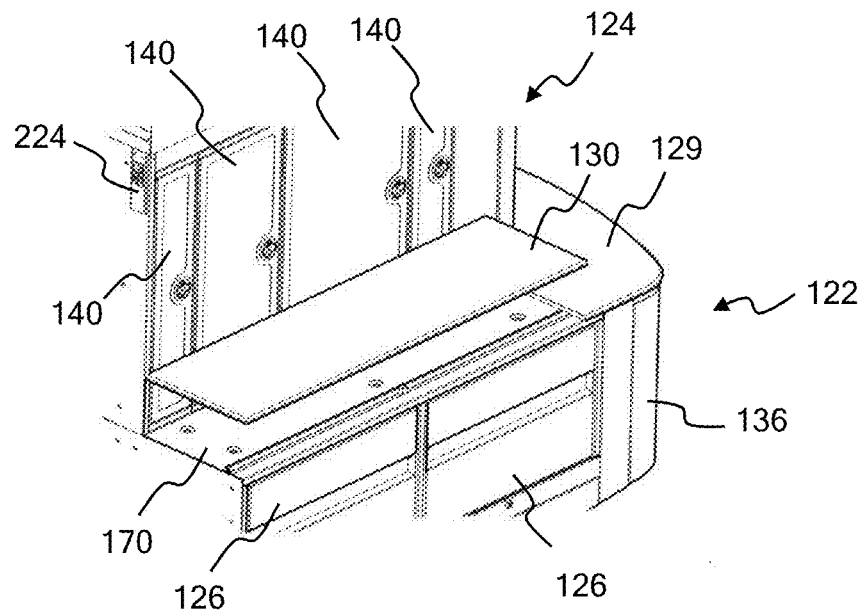
FIG. 18 is a front perspective view of a portion of the vending service unit 114 of FIG. 6, showing an embodiment of first counter portion 130 removed from lower concession portion top surface 170.
Figure 19:
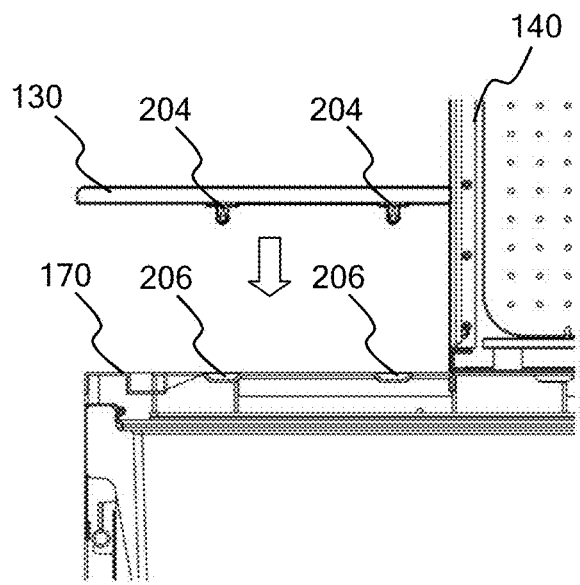
FIG. 19 is a cutaway view of the portion of the vending service unit 114 of FIG. 18 showing first counter portion 130 removed from lower concession portion top surface 170.
Figure 20:
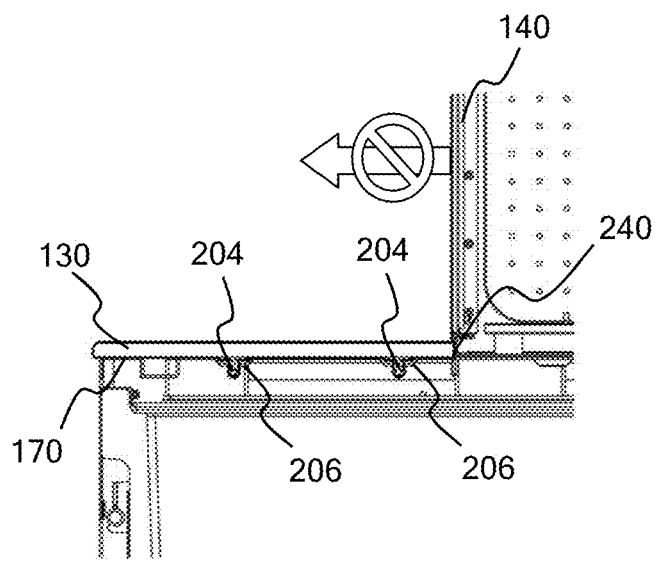
FIG. 20 is a cutaway view of the portion of the vending service unit 114 of FIG. 18 showing first counter portion 130 coupled to lower concession portion top surface 170, which prevents removable concession module 140 from being removed from vending service unit 114.

The second way that removable concession module 140 are coupled to lower concession portion top surface 170 of vending service unit 114 is by removable counter portions 130 and 131. Counter 128 has counter end portion 129, and first and second counter portions 130 and 131 (FIG. 7). In this embodiment first counter portion 130 is repeatably removable by the owner of vending service unit 114. In some embodiments both first and second counter portions 130 and 131 are repeatably removable by the owner of vending service unit 114. First and second counter portions 130 and 131 keep removable concession modules 140 from moving side-to-side on lower concession portion top surface 170, as shown in FIG. 18 through FIG. 20. First removable counter portion 130 in this embodiment includes counter couplers 204, as shown in FIG. 19. Lower concession portion top surface 170 includes counter coupler receivers 206, as shown in FIG. 19. Counter couplers 204 can be repeatably coupled to and uncoupled from counter coupler receivers 206, which repeatably couples and uncouples first removable counter portion 130 to lower concession portion top surface 170.

When first removable counter portion 130 is coupled to lower concession portion top surface 170 using counter couplers 204 and counter coupler receivers 206 as shown in FIG. 18 through FIG. 20, first counter portion 130 overlaps removable concession module 140 at overlap joint 240, as shown in FIG. 20. Removable concession module 140 is prevented from sliding towards first counter portion 130 in response to first counter portion 130 being coupled to lower concession portion top surface 170. Similarly, removable concession module 140 is prevented from sliding towards second counter portion 131 in response to second counter portion 131 being coupled to lower concession portion top surface 170. In this embodiment of vending service unit 114, second counter portion 131 is fixedly attached to lower concession portion top surface 170 at the factory. First counter portion 130 is removeably coupled to lower concession portion 130 so that the owner of vending service unit 114 can repeatably remove first counter portion 130 to interchange removable concession modules 140. In some embodiments both first and second counter portions 130 and 131 are removeably coupled to lower concession portion top surface 170.

Thus, in the embodiment of vending service unit 114 shown in the figures, removable concession modules 140 are removeably coupled to vending service unit body 120 using module locking bars 142 and first and second removable counter portions 130 and 131. Module locking bars 142 removeably couple each removable concession module 140 to vending service unit body 120. Each removable concession module 140 is prevented from being removed from vending service unit body 120 in response to first and second counter portions 130 and 131 being coupled to vending service unit body 120.

It is to be understood that the means and method for coupling removable concession modules 140 to vending service unit body 120 as shown in the figures is an example only. Removable concession module 140 can be coupled to vending service unit body 120 and/or vending service unit 114 using any suitable means that allows removable concession modules 140 to be repeatably coupled to and uncoupled from vending service unit body 120.

Vending service unit 114 includes counter 128. Counter 128 is coupled to lower concession portion top surface 170 as explained above. Counter 128 includes counter end portion 129 and first and second counter portions 130 and 131. Counter 128 effectively divides lower concession portion 122 from upper concession portion 124. Drawers 126 are mounted below counter 128, and open out from below counter 128. Counter 128 is substantially flat and horizontal in this embodiment so that counter 128 can be used as a table surface to set things on, to eat or drink at, and/or to conduct business on. Counter 128 wraps around three sides of vending service unit 114 so that the vendor and the customers of vending service unit 114 have a flat counter surface to access and use from almost any side of vending service unit 114. Counter 128 can be coupled to lower concession portion top surface 170 using any suitable means, includes counter couplers 204 and counter coupler receivers 206 as explained above.

Removable concession modules 140 according to the invention can take many forms. Removable concession modules 140 are used to store and vend items such as drinks, food, beverages, tobacco, etc. Removable concession modules 140 are reconfigurable and removable to allow different types of items to be stored and marketed. Any one removable concession module 140 can be reconfigured internally to store and display different items. And each removable concession module 140 can be removed and replaced with another removable concession module 140. Each removable concession module 140 is removeably coupled to vending service unit body 120 as explained above. In some embodiments removable concession module 140 receives power and/or signals from wiring harness 180 and/or power source 168. In some embodiments removable concession module 140 includes refrigeration unit 164 to keep contents cold. Removable concession module 140 can be used to store and vend ice cream, for example. In some embodiments removable concession module 140 includes heating unit 166 to warm contents, such as hot dogs, for example, or other warm or hot sandwiches. In some embodiments removable concession module 140 is temperature and humidity controlled to store and vend cigars and other tobacco products, for example. Removable concession modules 140 are removable and reconfigurable so that vending service unit 114 can be easily configured by the vendor to stock and sell different items at different times of the day or for particular venues or events.

Removable concession modules 140 each removeably and repeatably couple to vending service unit body 120, as discussed previously. Vending service unit 114 includes at least one removable concession module 140, where each of the at least one removable concession modules 140 removeably and repeatably couples to vending service unit body 120. Removable concession modules 140 can have any size and shape according to the particular design of vending service unit 114, vending service unit body 120, and removable concession modules 140.

Figure 21:
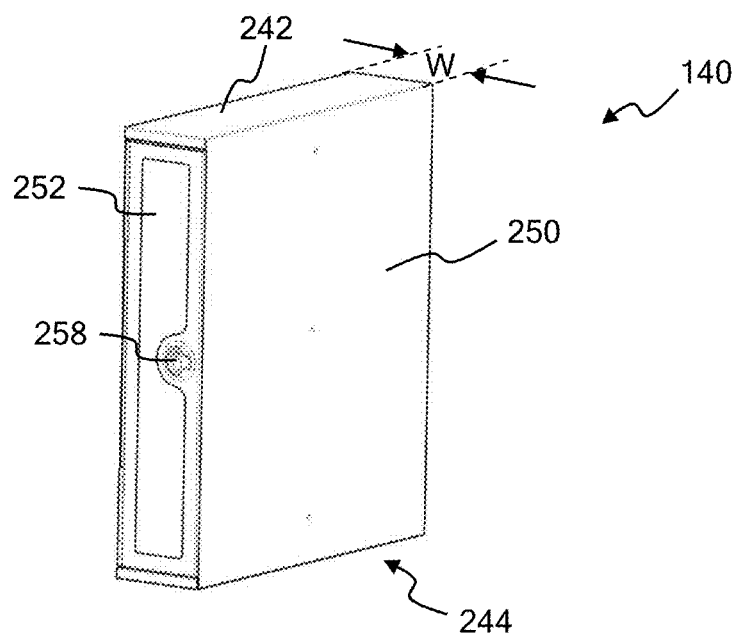
FIG. 21 is a perspective view of an embodiment of removable concession module 140 according to the invention.
Figure 22:
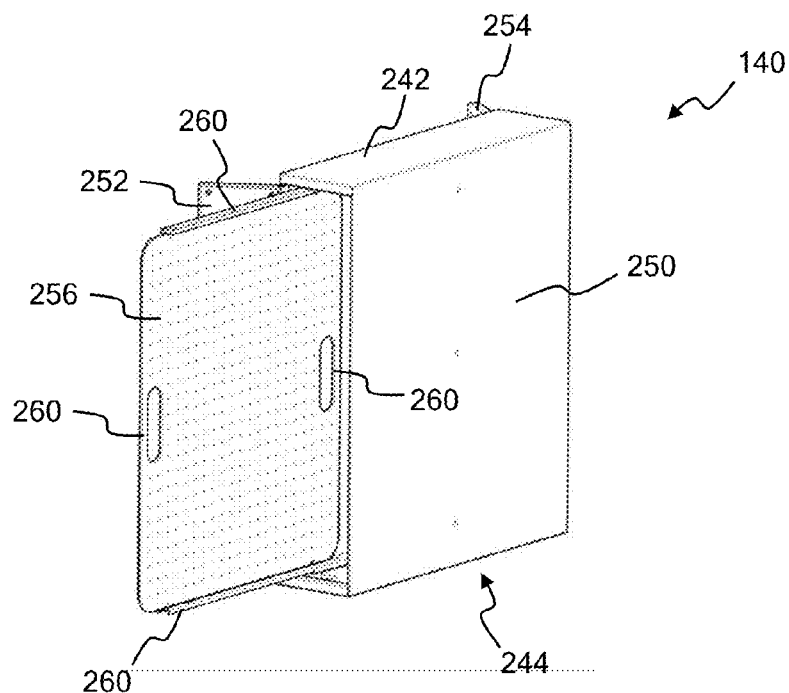
FIG. 22 is a perspective view of removable concession module 140 of FIG. 21, with doors 252 and 254 open and perforated display surface 256 slid out.

In the embodiment of vending service unit 114 shown in the figures, removable concession modules 140 are each rectangular in shape, as shown in FIG. 21 and FIG. 22. Removable concession module 140 in this embodiment includes top surface 242, bottom surface 244, sides 250, first door 252 and second door 254. Bottom surface 244 sets on lower concession portion top surface 170. First and second doors 252 and 254 open to allow access to the food, beverage, or other vending supplies or items stored inside removable concession module 140.

Removable concession modules 140 in the embodiment shown in FIG. 21 and FIG. 22 each have a width W. In this embodiment, removable concession modules 140 have widths W that are multiples of 6". This allows using removable concession modules 140 of different widths W to be used and interchanged, as desired by the vendor.

Removable concession modules 140 can have many different types of interior contents depending on the type of storing, vending, heating, cooling, etc. that the module 140 will be used for. Removable concession modules 140 can include shelves, cup storage, drink storage and/or dispense items, heating or cooling elements, boxes, hangers, or any type of hardware that promotes sales, display, or advertisement of vending items. FIG. 22 shows an example of the interior contents of a particular example embodiment of removable concession module 140. In this embodiment removable concession module 140 includes perforated storage surface 256 as shown. Perforated storage surface 256 is a flat plate of rigid or semi-rigid material that slides into and out of removable concession module 140 on tracks 260. In this embodiment perforated storage surface 256 is oriented vertically in removable concession module 140, with one track 260 at each of the top and bottom edges of perforated storage surface 256. Perforated storage surface 256 can be slid out of removable concession module 140 through either first door 252 or second door 254, using handles 260. Perforated storage surface 256 includes a plurality of perforations that can be used to hang clips, hooks, snaps, rings, or any other items that can be coupled to the perforations in perforated storage surface 256. The clips, hooks, snaps, etc can then be used to hang, display, and vend items for sale or items needed by the vendor or customers of vending service unit 114.

Figure 23:
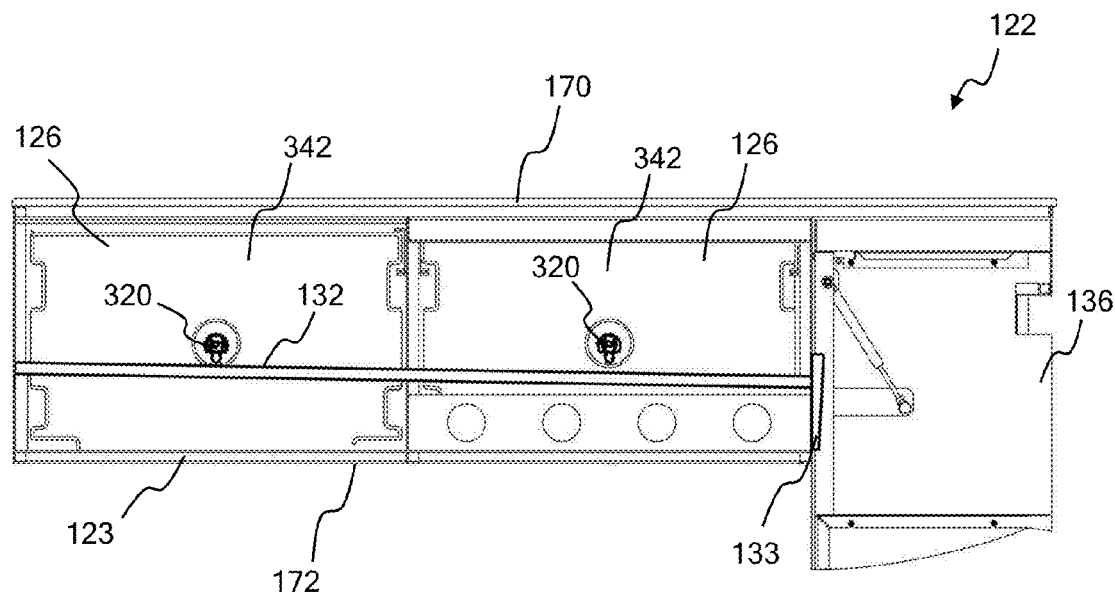
FIG. 23 is a side cutaway view of an embodiment of lower concession portion 122 according to the invention, showing rear overflow drains 320 near rear sides 342 of drawers 126, and water drain channel 132 positioned to collect water released from rear overflow drains 320.
Figure 24:
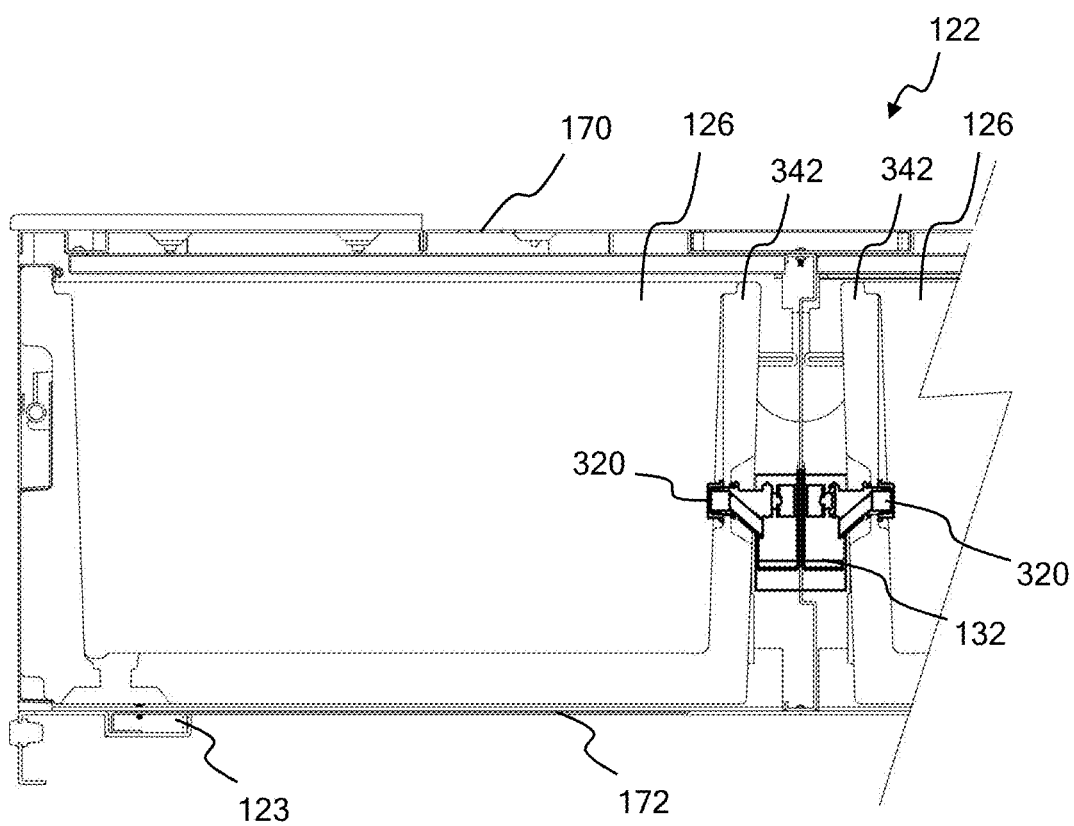
FIG. 24 is a front cutaway view of lower concession portion 122 of FIG. 20, showing rear overflow drains 320 near rear sides 342 of drawers 126, and water drain channel 132 positioned to collect water released from rear overflow drains 320.

As mentioned previously, vending service unit body 120 includes lower concession portion frame 123, as shown in FIG. 12, FIG. 23, and FIG. 24. FIG. 23 shows a front-to-back cross-section of lower concession portion 122. FIG. 24 shows a side-to-side cross-section of lower concession portion 122. Lower concession portion frame 123 includes lower concession portion top surface 170, lower concession portion bottom surface 172, and storage compartments 134.

Lower concession portion 122 also includes water drain channel 132, as shown in FIG. 12, FIG. 23, and FIG. 24. Drawers 126 in this embodiment of vending service unit 114 each have a rear overflow drain 320 on rear side 342 of each drawer 126. Rear overflow drain 320 can be opened and closed, and when open, rear overflow drain 320 drains water from drawer 126. Whenever water in drawer 126 is above the predetermined level of rear overflow drain 320, the water will be drained (released) from rear overflow drain 320. Water drain channel 132 is positioned below each of the plurality of rear overflow drains 320. Water drain channel 132 collects the water released from rear overflow drains 320. In this embodiment water drain channel 132 extends longitudinally through lower concession portion 122 of vending service unit 114 between the rear sides of the four drawers 126, as shown in FIGS. 23 and 24. In this embodiment water drain channel 132 is sloped towards the rear of vending service unit 114. Water drain channel 132 collects water from each rear overflow drain 320 and channels the water towards water drain channel end piece 133. Water drain channel end piece 133 routes the water to the exterior of vending service unit 114, such as to the ground. Each drawer 126 can be continuously emptied of water above a predetermined level by rear overflow drain 320. It is to be understood that water drain channel 132 can take many shapes and configurations according to accommodate different shapes and size of vending service unit 114. Water drain channel 132 can take any configuration that allows water drain channel 132 to collect water from one or more rear overflow drains 320 and route the water to the exterior of vending service unit 114.

Lower concession portion 122 of vending service unit 114 according to the invention includes at least one drawer 126. In the embodiment shown in the figures, vending service unit 114 includes four drawers 126. In this embodiment more than one drawer 126 can be opened at a time. In some embodiments only one drawer 126 can be opened at a time.

Figure 25:
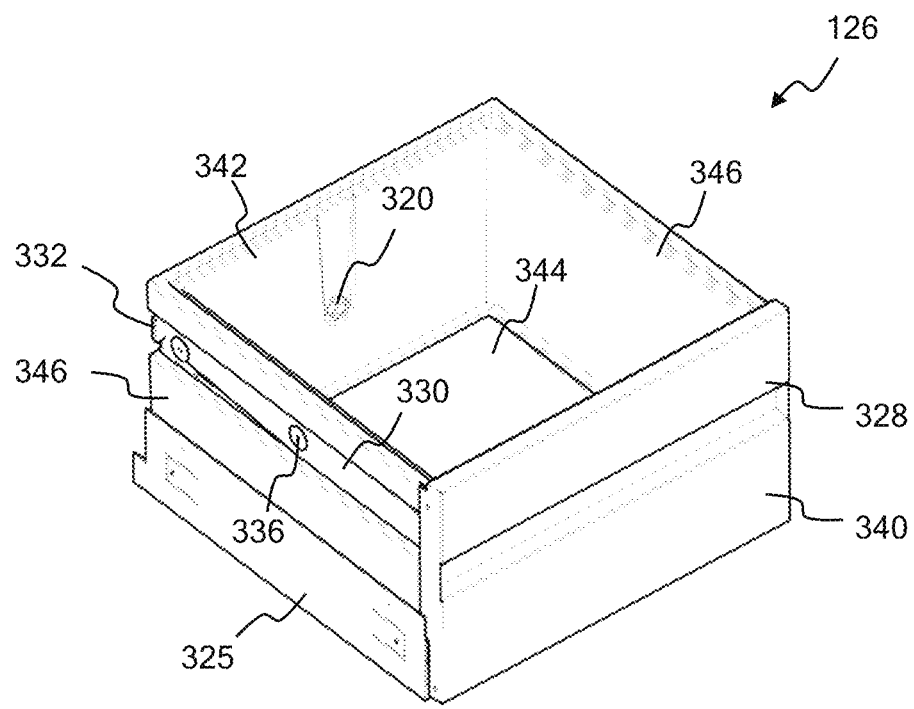
FIG. 25 is a front perspective view of an embodiment of drawer 126 of vending service unit 114 of FIG. 6.
Figure 26:
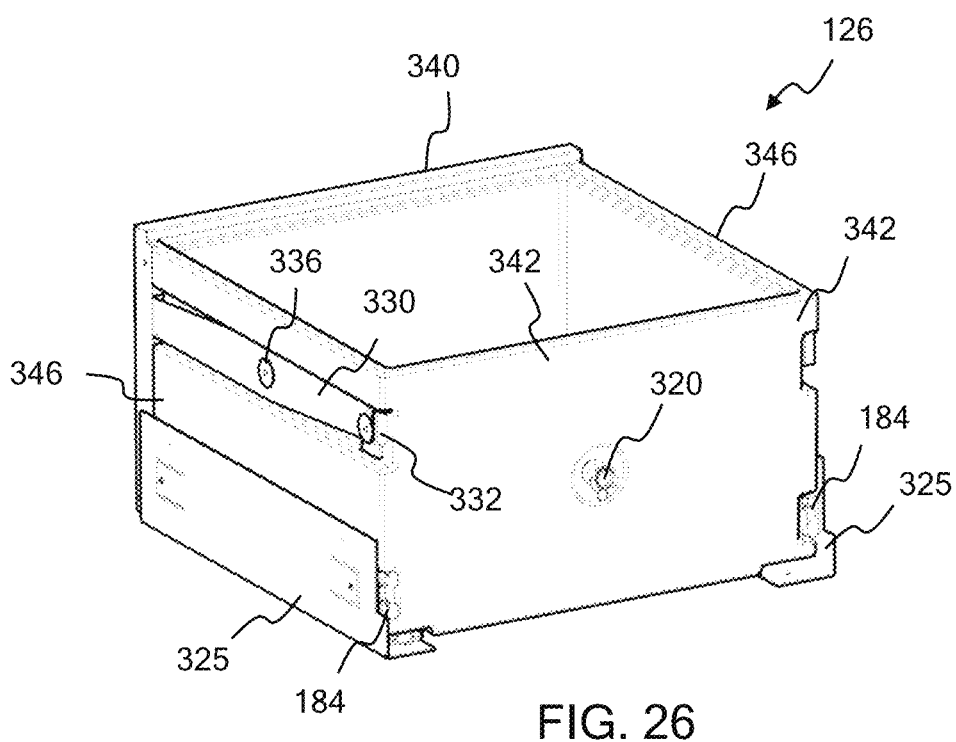
FIG. 26 is a rear perspective view of drawer 126 of FIG. 25.
Figure 27:
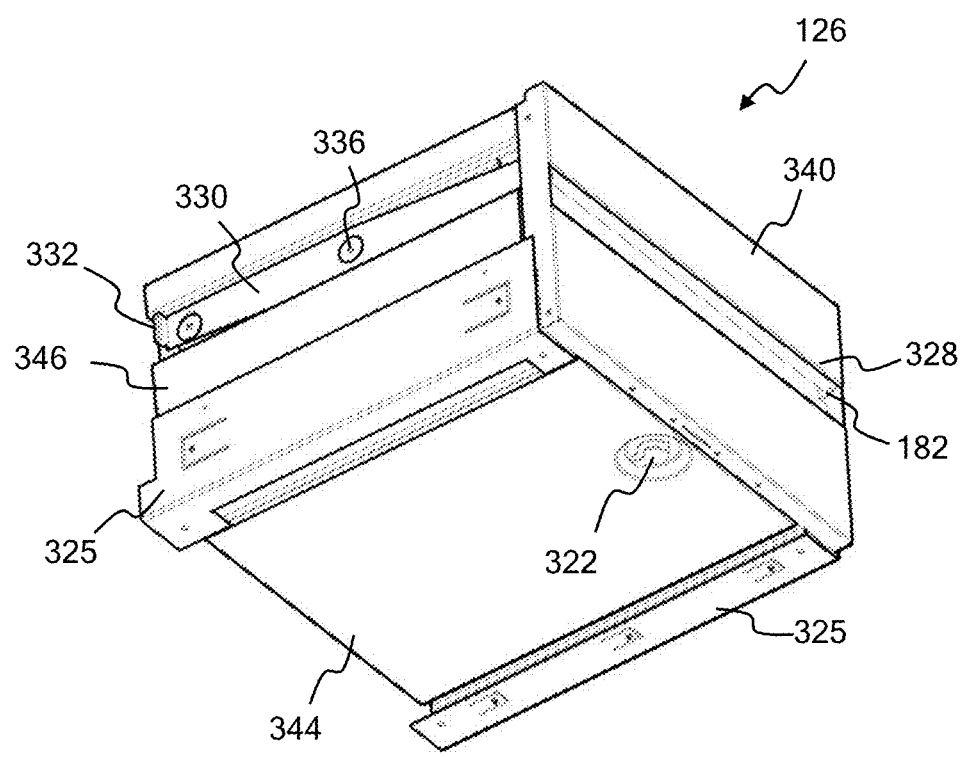
FIG. 27 is a bottom perspective view of drawer 126 of FIG. 25.

Drawers 126 according to the invention can take many forms. FIG. 25 through FIG. 31 show different views of an embodiment of drawer 126 according to the invention. FIG. 25 shows a front perspective view of an embodiment of drawer 126 according to the invention. FIG. 26 shows a rear perspective view of the embodiment of drawer 126 of FIG. 25. FIG. 27 shows a bottom perspective view of the embodiment of drawer 126 of FIG. 25. Drawers 126 in this embodiment are rectangular in shape, with front 340, back 342, bottom 344, and two sides 346. It is to be understood that drawers 126 can take many forms, shapes and sizes, with the drawers 126 shown in the figures being only an example embodiment.

Drawer 126 shown in the figures has handle 328 on front 340 and bottom drain 322 on bottom 344. Bottom drain 322 can be opened to drain water or other fluids out of drawers 126, and closed when drawer 126 is not being drained. Drawer 126 also includes rear overflow drain 320 on rear 342. Rear overflow drain 320 can be opened to drain water from drawer 126 when the water or other fluids in drawer 126 reach a level above a predetermined fluid level in drawer 126, as described above. The predetermined level above which fluid will be drained is determined by the position of rear overflow drain 320 on rear 342.

Drawers 126 are coupled to vending service unit body 120 using drawer slides 184 and drawer slide mounts 325. Drawers 126 slide in and out on drawer slides 184. Drawer slides 184 are coupled to drawer slide mounts 325. Drawer slide mounts 325 are coupled to vending service unit body 120.

Figure 28:
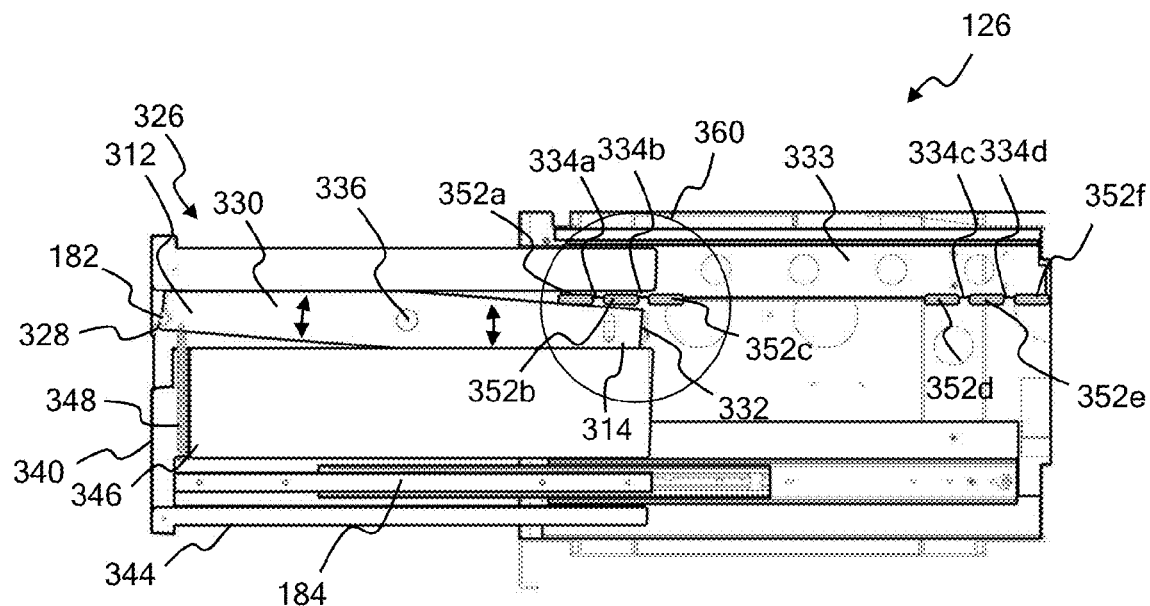
FIG. 28 is a side view of an embodiment of drawer 126 according to the invention, with drawer 126 slid out along drawer slide 184, and with drawer lock lever 330 in the unlocked position.
Figure 29:
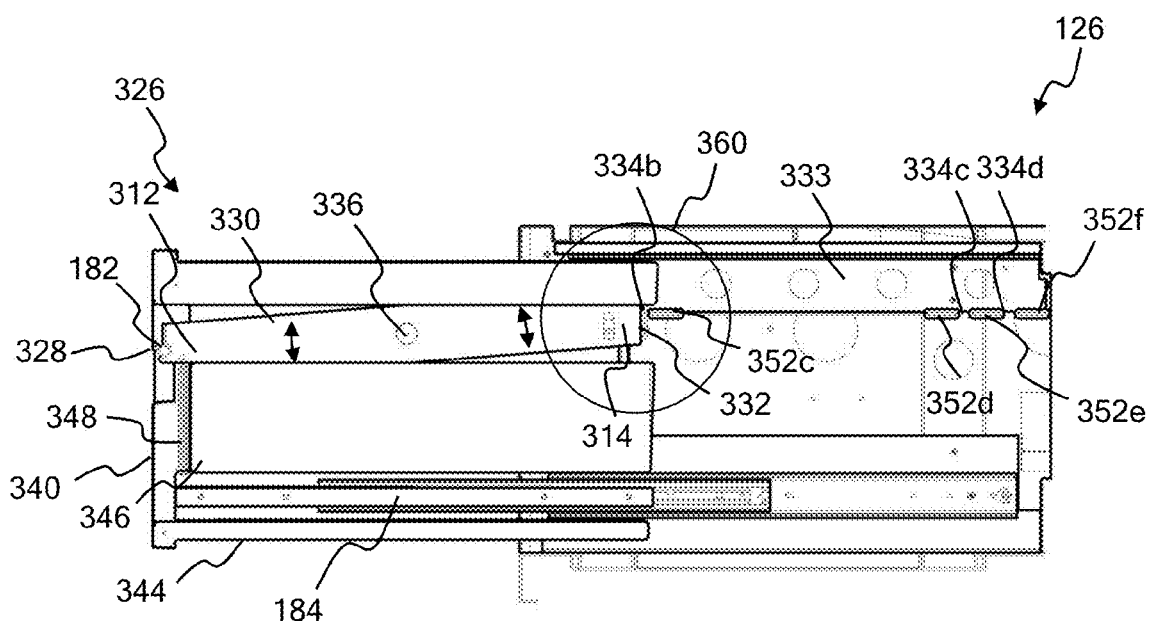
FIG. 29 is a side view of an embodiment of drawer 126 according to the invention, with drawer 126 slid out along drawer slide 84, and with drawer lock lever 330 in the locked position.
Figure 30:
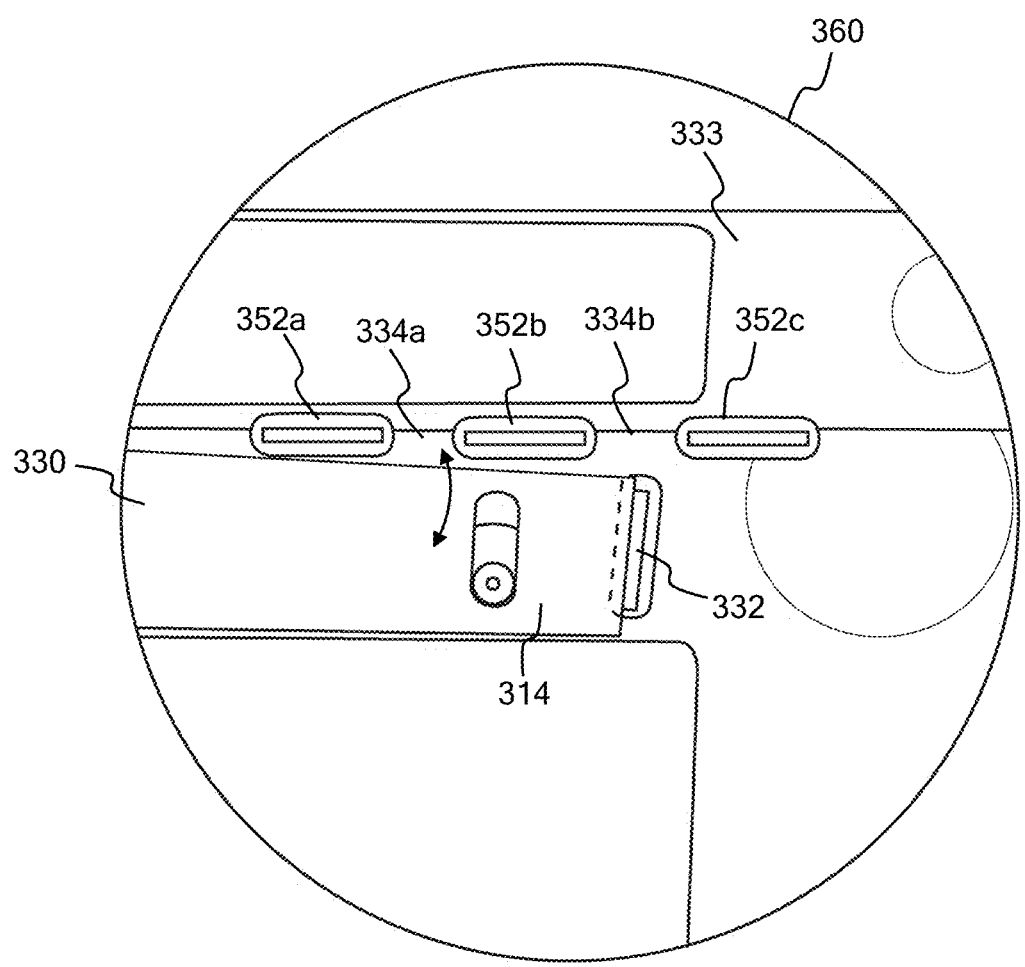
FIG. 30 is an enlargement of section 360 of FIG. 28 showing drawer lock lever 330 in the unlocked position and drawer lock tab 332 removed from slot 334b of slot bar 333.
Figure 31:
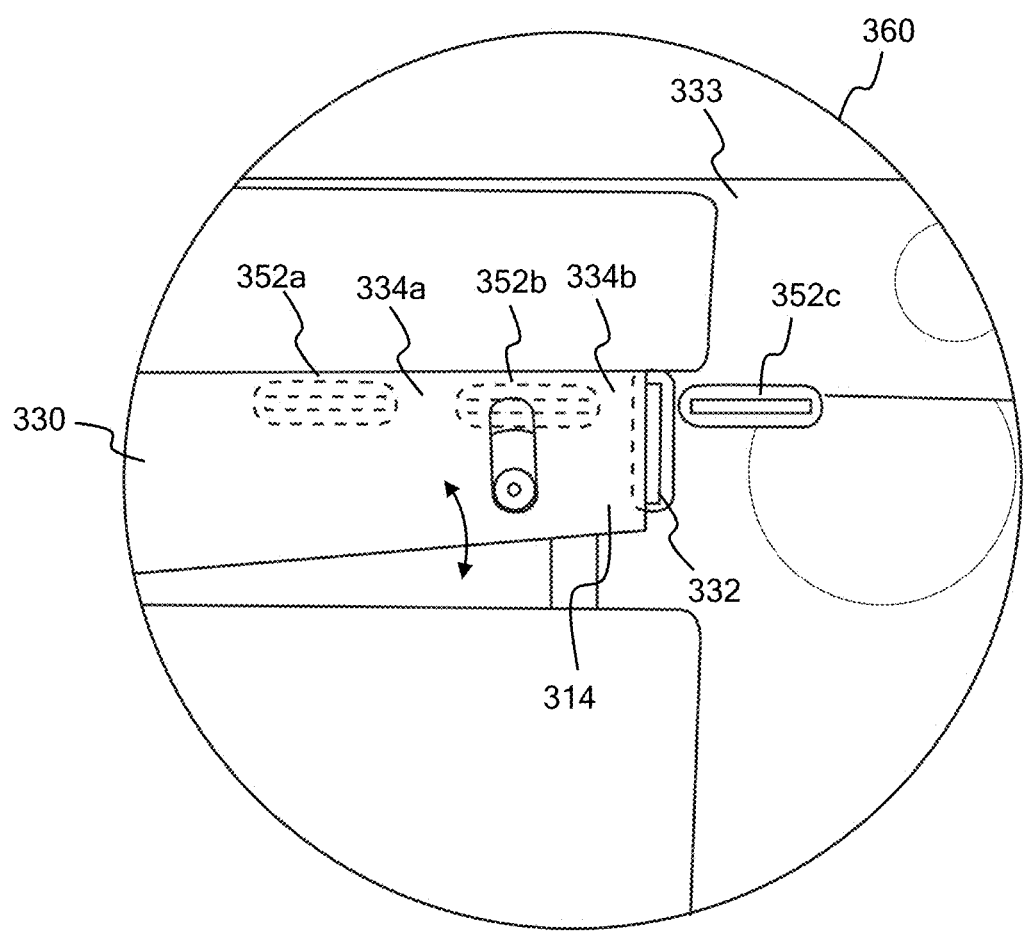
FIG. 31 is an enlargement of section 360 of FIG. 28 showing drawer lock lever 330 in the locked position and drawer lock tab 332 extended into slot 334b of slot bar 333, locking drawer 126 from sliding along drawer slide 184.

In this embodiment drawers 126 each include a drawer lock system 326 (FIG. 28 and FIG. 29). Drawer lock system 326 locks and unlocks drawer 126 from sliding along drawer slide 184. Drawer 126 can be moved along drawer slide 184 only when drawer lock release bar 182 is in the unlocked position. Drawer 126 according to the invention is prevented from being moved along drawer slide 184 when drawer lock release bar 182 is in the locked position. Drawer lock release bar 182 in this embodiment is beneath drawer handle 328, as shown in FIG. 27. Drawer lock release bar 182 is placed in the unlocked position using hand pressure. In some embodiments drawer lock release bar 182 is placed in the unlocked position with one hand. In this embodiment drawer lock release bar 182 requires pressure from two hands to be placed in the unlocked position. In this embodiment drawer lock release bar 182 is placed in the unlocked position in response to receiving an amount of lock release pressure from two hands. Requiring pressure from two hands to place drawer lock release bar 182 in the unlocked position is a safety feature that ensures drawers 126 are not opened by mistake. FIGS. 28 and 29 are side view of a drawer 126 and drawer lock system 326, showing how drawer lock system 326 operates, and how drawer lock release bar 182 is activated. FIG. 30 and FIG. 31 are close-up views of section 360 of FIGS. 28 and 29, showing how drawer lock system 326 locks drawer 126 when drawer lock release bar 182 is in the locked position.

Drawer lock system 326 includes drawer lock lever 330 and lever pivot rod 336. Drawer lock release bar 182 is coupled to drawer lock lever 330 of drawer lock system 326. Drawer lock lever 330 is rotationally coupled to side 346 of drawer 126 with lever pivot rod 336. Drawer lock lever 330 rotates on lever pivot rod 336. Drawer lock lever 330 rotates between a locked and an unlocked position, as will be explained below. Lever pivot rod 336 is coupled to drawer lock lever 330 in approximately the center of the length of drawer lock lever 330. Drawer lock lever 330 extends the length of side 346 of drawer 126 with drawer lock lever front end 312 near drawer front 340, and drawer lock lever rear end 314 near drawer rear 342, as shown in the figures. Drawer lock lever front end 312 couples to drawer lock release bar 182 and spring 348. Drawer lock lever release bar 182 in this embodiment extends across the width of drawer front 340 under drawer handle 328, as shown in FIG. 27. In this embodiment drawer lock system 326 includes two drawer lock levers 330, one on each side 346. Drawer lock release bar 182 is coupled at each of its ends to a drawer lock lever front end 312.

Drawer lock release bar 182 is operated with the hands, as discussed earlier. Moving drawer lock release bar 182 up and down with the hands places drawer lock system 326, drawer lock release bar 182, and drawer lock lever 330 in the locked and unlocked position. When drawer lock release bar 182 is moved upwards, away from drawer bottom 344, drawer lock system 326, drawer lock release bar 182 and drawer lock lever 330 are in the unlocked position, shown in FIG. 28 and FIG. 30 (FIG. 30 to be discussed in more detail shortly). When drawer lock system 326, drawer lock release bar 182 and drawer lock lever 330 are in the unlocked position, drawer 126 is free to slide open and closed on drawer slides 184.

Drawer lock system 326 includes slotted bar 333, lock slots 334, bar sections 352, and drawer lock tab 332. When drawer lock release bar 182 is moved downwards, towards drawer bottom 344, drawer lock system 326, drawer lock release bar 182 and drawer lock lever 330 are in the locked position, shown in FIG. 29 and FIG. 31 (FIG. 31 to be discussed in more detail shortly). When drawer lock system 326, drawer lock release bar 182 and drawer lock lever 330 are in the locked position, drawer 126 is able to slide only enough to position drawer lock tab 332 of drawer lock lever 330 into one of the plurality of lock slots 334 in slotted bar 333, and then drawer 126 is locked and cannot slide on drawer slide 184. Once drawer lock tab 332 moves into one of the plurality of lock slots 334, drawer 126 is prevented from sliding along drawer slide 184. Drawer lock tab 332 and slots 334 of slotted bar 333 provide a mechanism to prevent drawer 126 from moving along drawer slide 184.

Spring 348 biases drawer lock lever 330 in the locked position, as shown in FIG. 29 and FIG. 31. One end of spring 348 is coupled to drawer lock lever 330 front end 312. The other end of spring 348 is coupled to drawer slide 184. Spring 348 can be coupled to drawer 126 and drawer lock lever 330 in many different ways such that spring 348 biases drawer lock lever 330 in the unlocked position. In this embodiment spring 348 biases drawer lock lever 330 such that drawer lock lever front end 312 is biased downwards towards drawer bottom 344. Thus when there is no force pushing first end 312 of drawer lock lever 330 upwards, drawer locked lever 330 rotates into the locked position. When a person uses their hands to push drawer lock release bar 182 upwards, which pushes first end 312 of drawer lock lever 330 upwards, drawer lock lever 330 first end 312 moves upwards away from drawer bottom 344, and drawer lock lever 330 rotates into the unlocked position. In some embodiments it takes two hands to push drawer lock release bar 182 upwards. This is a safety feature that ensures that drawer 126 is not opened accidentally and that both hands are in a safe position under handle 328 instead of in a position where a hand can get tangled in the mechanisms of drawer 126.

Drawer lock system 326 includes slotted bar 333, as shown in FIG. 28 through FIG. 31. Slotted bar 333 is fixedly coupled to vending service unit body 120. Slotted bar 333 includes plurality of bar sections 352 spaced apart by lock slots 334, as can best be seen in close-up sections 360 in FIG. 30 and FIG. 31. Lock slots 334 engage lock tab 332 of drawer lock lever 330 to prevent drawer 126 from moving along drawer slide 184. Drawer 126 is prevented from moving when lock tab 332 is positioned in one of the plurality of lock slots 334 as shown in FIG. 31. In FIG. 31, lock tab 332 is positioned in lock slot 334b. Bar sections 352b and 352c prevent drawer 126 from sliding along drawer slide 184 more than the width of lock slot 334b when lock tab 332 is positioned in lock slot 334b.

When drawer lock system 326 and drawer lock lever 330 is in the unlocked position—drawer lock lever 330 is rotated such that first end 312 is positioned away from drawer bottom 344 in response to drawer lock release bar 182 moving upwards from pressure from a hand or hands—then drawer 126 can slide along drawer slide 184 (FIG. 28 and FIG. 30). In the unlocked position of drawer lock lever 330, drawer lock lever second end 314 is positioned towards drawer bottom 344, and lock tab 332 is positioned such that lock tab 332 does not engage any of the plurality of lock slots 334, as shown in FIG. 30.

When there is no pressure on drawer lock release bar 182 from a person's hands holding it up, for instance, drawer lock lever 330 is rotated by spring 348 into the locked position, placing drawer lock system 326 in the locked position. Spring 348 biases drawer lock lever first end 312 downwards towards drawer bottom 344, which moves drawer lock lever second end 314 upwards away from drawer bottom 344 (FIG. 29 and FIG. 31.). Lock tab 332 moves into one of the plurality of lock slots 334 in response to drawer lock lever second end 314 moving upwards away from drawer bottom 344. Drawer 126 is locked—prevented from sliding on drawer slide 184 when lock tab 332 is positioned in one of the plurality of lock slots 334. In this way drawer lock system 326 prevents drawer 126 from sliding along drawer slide 184 when drawer lock lever 330 is in the locked position.

Figure 32:
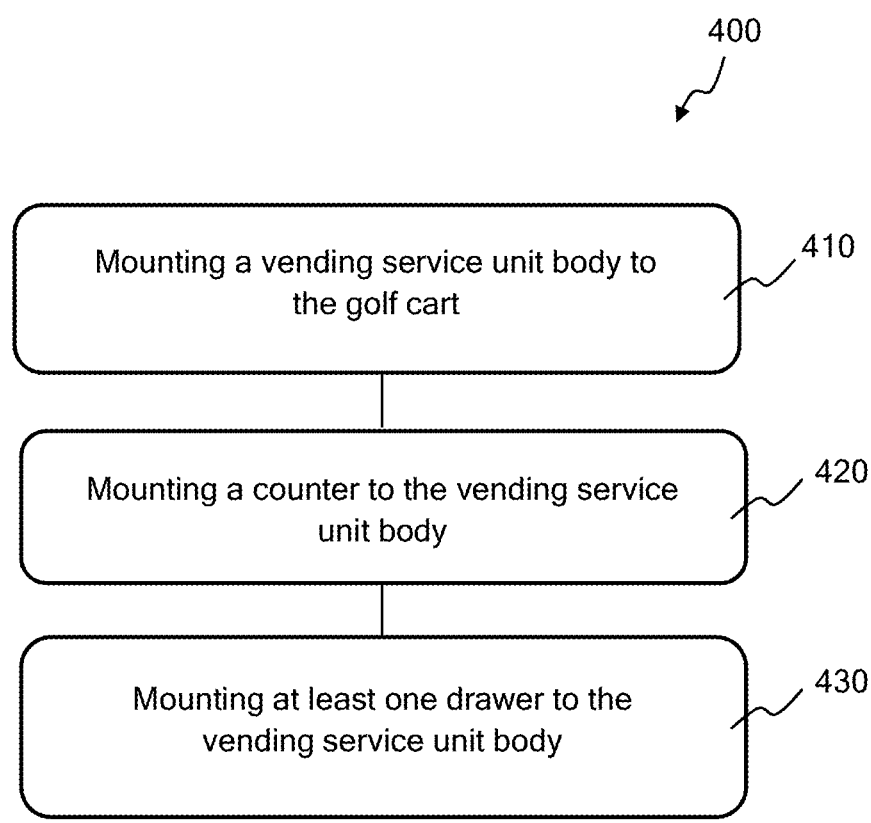
FIG. 32 illustrates method 400 of mounting the vending service unit to a golf cart or other vehicle according to the invention.

FIG. 32 illustrates method 400 of mounting a vending service unit to a golf cart. Method 400 of mounting a vending service unit to a golf cart according to the invention includes step 410 of mounting a vending service unit body to the golf cart. Method 400 of mounting a vending service unit to a golf cart also includes step 420 of mounting a counter to the vending service unit body. Method 400 of mounting a vending service unit to a golf cart also includes step 430 of mounting at least one drawer to the vending service unit body. Method 400 according to the invention can include many other steps. In some embodiments method 400 includes the step of removeably mounting a removable concession module to the vending service unit body. In some embodiments the step of removeably mounting a removable concession module to the vending service unit body includes the steps of placing a removable concession module on the vending service unit body, lowering a module locking bar against a top surface of the removeably concession module, and locking module locking bar in the lowered position, where the removable concession module is prevented from being removed from the vending service unit body in response to the module locking bar being locked in the lowered position.

In some embodiments method 400 includes the step of electrically coupling an upper concession portion to a power source, where the power source does not supply power to the golf cart. In some embodiments method 400 includes the step of running a wiring harness through the vending service unit body. In some embodiments method 400 includes the step of electrically coupling one of the at least one drawers to the wiring harness A vending service unit that attaches to a golf cart has been described. The vending service unit attaches to any golf cart or similar vehicle to transform the vehicle into a golf cart with food and retail service features. The vending service unit provides a means and method for vending food and other retail items on a golf course, for example, or other place where people gather. The vending service unit provides compartments to store and vend hot and cold items such as beverages and food. The vending service unit provides methods for storing and vending consumable ice, tobacco products, beverages, and other retail items. The vending service unit includes a counter that can be used to conduct business on or eat at. The vending service unit includes drawers that are individually insulated and that can hold and keep cold beverages, food, and potable ice. The vending service unit includes removable concession modules that can be removed and reconfigured by the vendor to customize the vending capabilities for the time of day or the venue. It is to be understood that the embodiment of the vending service unit according to the invention as shown and described is an example only and that many other embodiments of a vending service unit and a golf cart with food and beverage retail features according to the invention are possible and envisioned.

The embodiments and examples set forth herein were presented in order to best explain the present invention and its practical application and to thereby enable those of ordinary skill in the art to make and use the invention.

However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A mobile unit with food and retail service features comprising:
   a power vehicle;
   a vending service unit, wherein the vending service unit couples to the vehicle and wherein the vending service unit comprises:
      a vending service unit body;
      at least one drawer that couples to the vending service unit body; and
      a counter that couples to the vending service unit body above the at least one drawer, wherein the counter extends around three sides of the vending service unit and oriented horizontally; and
   at least one concession module that couples to the vending service unit body; and
   a module locking bar, wherein the module locking bar couples each of the at least one concession modules to the vending service unit body.

2. The mobile unit of claim 1, wherein the at least one drawer is four drawers that each couple to the vending service unit body beneath the counter, and wherein no more than one of the at least one drawers can be opened at a time.

3. The mobile unit of claim 1, wherein the vending service unit further comprises at least one removable concession module, wherein each of the at least one removable concession modules removeably couples to the vending service unit body.

4. The mobile unit of claim 3, wherein the vending service unit further comprises a module locking bar, wherein the module locking bar removeably couples each of the at least one removable concession modules to the vending service unit body.

5. A vending service unit that couples to a vehicle, the vending service unit comprising:
   a vending service unit body, wherein the vending service unit body comprises:
      a lower concession portion, wherein the lower concession portion comprises a lower concession portion top surface;
      an upper concession portion, wherein the upper concession portion couples to the lower concession portion top surface, the upper concession portion comprising:
         at least one removable concession module;
         an upper convertible beverage service module;
         a removable module mounting frame;
         a first module locking bar coupled to the removable module mounting frame; and
         a second module locking bar coupled to the removable module mounting frame;
         wherein the first and the second module locking bars removably couple each of the at least one removable concession modules to the vending service unit body;
   a counter mounted to the lower concession portion top surface, wherein the counter extends around three sides of the vending service unit and wherein the counter is oriented horizontally; and
   a plurality of drawers, wherein each drawer opens out from beneath the counter, and wherein each drawer is removeably coupled to the lower concession portion.

6. The vending service unit of claim 5, wherein the lower concession module further comprises one or more lower storage compartments, the one or more lower storage compartments comprising a door which opens out from beneath the counter.

7. The vending service unit of claim 5, wherein the vending service unit body further comprises:
   a refuse compartment, the refuse compartment comprising one or more containers;
   a refuse compartment mounting point;
   a cylinder mounting bar; and
   at least one air cylinder comprising a first end and a second end, wherein the refuse compartment opens out from beneath the counter and is rotatably coupled to the refuse compartment mounting point of the vending service unit body by the at least one air cylinder tiltably coupled at the first end to the refuse compartment and at the second end to the cylinder mounting bar.

8. The vending service unit of claim 5, wherein one of the plurality of drawers further comprises a bottom drain.

9. The vending service unit of claim 5, wherein the upper convertible beverage service module further comprises:
   a beverage compartment;
   a beverage door; and
   a convertible beverage tray, comprising:
   a first side with circular openings; and
   a second side with circular openings, wherein the convertible beverage tray is reversibly coupled to the upper convertible beverage service module.

10. The vehicle of claim 5, wherein the vehicle is a small off-road vehicle.

11. The convertible beverage tray of claim 9, wherein the circular openings of the first side have a different size than the circular openings of the second side.

12. The vending service unit of claim 10, wherein any one or more of the counter, beverage doors, and the plurality of drawers further comprise one or more surfaces configured for display of advertising information.

13. The vending service unit of claim 5, wherein the vending service unit body further comprises:
   a lower concession portion frame; and
   a skirt coupled below the lower concession portion frame proximate to the rear wheels of the vehicle.

* * * * *